(12) United States Patent  
Maruyama et al.

(10) Patent No.: US 6,558,127 B2  
(45) Date of Patent: May 6, 2003

(54) FLUID DISCHARGE DEVICE AND FLUID DISCHARGE METHOD

(75) Inventors: Teruo Maruyama, Hirakata (JP); Takashi Sonoda, Shiga-ken (JP)

(73) Assignee: Matsushita Electric Industrial Co., Ltd., Kadoma (JP)

( * ) Notice: Subject to any disclaimer, the term of this patent is extended or adjusted under 35 U.S.C. 154(b) by 0 days.

(21) Appl. No.: 09/799,682

(22) Filed: Mar. 7, 2001

(65) Prior Publication Data

US 2001/0043864 A1 Nov. 22, 2001

(30) Foreign Application Priority Data

Mar. 7, 2000 (JP) .................................. 2000-061471  
Jun. 23, 2000 (JP) .................................. 2000-188899  
Nov. 8, 2000 (JP) .................................. 2000-340000

(51) Int. Cl.[7] ............................................... F04B 49/06
(52) U.S. Cl. ..................... 417/44.1; 222/333; 239/537; 239/584; 239/585.5
(58) Field of Search ..................... 417/44.1, 322; 222/333, 505; 239/537, 538, 539, 540, 581.2, 584, 585.1, 585.4, 585.5

(56) References Cited

U.S. PATENT DOCUMENTS

| 4,195,329 | A | * | 3/1980 | Woog ......................... 362/120 |
| 4,514,742 | A | * | 4/1985 | Suga et al. ................... 417/322 |
| 5,553,742 | A | * | 9/1996 | Maruyama et al. ........... 222/504 |
| 5,641,270 | A | * | 6/1997 | Sgourakes et al. ........... 417/322 |
| 6,257,445 | B1 | * | 7/2001 | Means et al. ................ 222/504 |
| 6,279,842 | B1 | * | 8/2001 | Spain ....................... 239/585.4 |
| 6,318,599 | B2 | * | 11/2001 | Estelle et al. ............. 239/585.4 |

FOREIGN PATENT DOCUMENTS

| JP | 01241498 A | * | 9/1989 |
| JP | 10-128217 |   | 5/1998 |
| SU | 1426749 A | * | 9/1988 |
| WO | 99/49987 |   | 10/1999 |

* cited by examiner

*Primary Examiner*—Charles G. Freay  
*Assistant Examiner*—John F Belena  
(74) *Attorney, Agent, or Firm*—Wenderoth, Lind & Ponack, L.L.P.

(57) ABSTRACT

The fluid discharge device includes an axial drive device for giving an axial relative displacement to between a piston and a cylinder, a device for giving rotary motion, and a device for pressure feed of fluid. The ON/OFF control of discharge flow rate can be fulfilled by changing the fluid resistance of the discharge passage with the axial drive device.

16 Claims, 28 Drawing Sheets

FLUID DISCHARGE DEVICE AND FLUID DISCHARGE METHOD

BACKGROUND OF THE INVENTION

The present invention relates to a fluid discharge device for discharging and feeding in a specified amount a variety of liquids such as conductive paste, adhesive, solder cream, grease, paint, hot melt, chemicals, and foods, or for uniformly coating a fluorescent material or the like onto the display surface of CRT, PDP, or the like with high accuracy, in production processes in the fields of electronic components, household electric appliances, and so on.

The fluid discharge device (dispenser) has conventionally been used in a variety of fields. In response to recent years' needs for smaller size and higher recording density of electronic components, there has arisen a demand for a technique that allows an infinitesimal quantity of fluid material to be fed stably with high accuracy.

Otherwise, there is also a great demand for a fluid discharge method for uniformly coating a fluorescent substance on the display surface of CRT, PDP, or the like.

Taking the field of surface mount technology (SMT) as an example, the issues of the dispenser are summarized as follows in line with the trend towards higher mounting speed, miniaturization, higher density, higher quality, and automatization:

(1) Higher accuracy of coating quantity;
(2) Reduction in discharge time
(3) Smaller coating quantity per dot Conventionally, a dispenser of an air pulse system as shown in FIG. 17 is widely used as a fluid discharge device. The technique is introduced in, for example, "AUTOMATED ENGINEERING, '93, Vol. 25, No. 7."

The dispenser of this system applies in pulses a specified amount of air supplied from a constant pressure source to the inside of a container (cylinder) 150 to discharge a specified amount of liquid corresponding to a rise in pressure inside the cylinder 150 from a nozzle 151.

For the purpose of feeding a fluid at an infinitesimal flow rate, a micro pump utilizing a piezoelectric element has been developed. For example, "SUPERSONIC TECHNO, June Issue, '59" introduces the contents as follows. FIG. 18 shows a principle diagram, while FIG. 19 shows its concrete structure. When a voltage is applied to a laminate piezoelectric actuator 200, a mechanical extension occurs, and this extension is increased by the action of a displacement magnifying mechanism 201. Further, a diaphragm 203 is pushed upward in the figure via a thrust rod 202, and the capacity of a pump chamber 204 is reduced. In this stage, a check valve 206 of an inlet 205 is closed, and a check valve 208 of an outlet 207 is opened, discharging the fluid located inside the pump chamber 204. Next, when the application voltage is decreased, the mechanical extension decreases with decreasing voltage. The diaphragm 203 is pulled back downward by a coil spring 209 (restoring action), by which the internal capacity of the pump chamber 204 is increased to provide a negative pressure in the pump chamber 204. Due to this negative pressure, the inlet check valve 206 is opened to fill the pump chamber 204 with the fluid. In this stage, the outlet check valve 208 is closed. The coil spring 209 plays the important role of applying a mechanical pre-load to the laminate piezoelectric actuator 200 via the displacement magnifying mechanism 201 in addition to the action of pulling back the diaphragm 203. The above operations will subsequently be repeated.

This constitution employing the piezoelectric actuator could make it possible to realize a small-size, infinitesimal-flow-rate pump having excellent flow rate accuracy.

Out of the aforementioned prior art examples, the dispenser of the air pulse system has had the following issues.

(1) Variations in discharge rate due to discharge pressure pulsations
(2) Variations in discharge rate due to water head differences
(3) Changes in discharge rate due to liquid viscosity changes The phenomenon of the issue (1) appears more noticeably as the cycle time becomes shorter and the discharge time is shorter. Accordingly, it has been practiced to take measures such as providing a stabilizer circuit for uniforming the air pulse height.

The issue (2) is ascribed to the reason that the capacity of an air gap portion 152 in the cylinder differs depending on a remaining liquid quantity H, and the degree of pressure change inside the air gap portion 152 is largely changed by the quantity H when a specified amount of high-pressure air is supplied. There has been an issue that the coating quantity decreases by, for example, about 50 to 60% as compared with the maximum value if the remaining liquid quantity is lowered. Accordingly, it has been practiced to take measures such as detecting the remaining liquid quantity H every occasion of discharge and adjusting the time duration of the pulse so that the discharge rate becomes uniform.

The issue (3) occurs, for example, when a material containing a large amount of solvent has changed in viscosity with a lapse of time. As a countermeasure against the issue, there has been taken a measure of preparatorily programming the tendency of the viscosity change on the time base in a computer and adjusting, for example, the pulse width so as to correct the influence of the viscosity change.

Any of the countermeasures against the issues has led to a complicated control system including the computer and has difficulties in coping with irregular changes in environment conditions (temperature and the like). Thus, the countermeasures have not been drastic proposals for solution.

Furthermore, when a piezo-pump employing the aforementioned laminate piezoelectric actuator shown in FIGS. 18 and 19 is used for high-speed intermittent coating of a high-viscosity fluid for use in the field of surface mount technology or the like, or when it is necessary to abruptly stop the outflow after a continuous coating, the following issues are predicted.

In the field of surface mount technology, recently, there has been a desire for, for example, a dispenser that instantaneously coats not more than 0.1 mg of an adhesive (viscosity: 100,000—several 1,000,000's CPS) within a time of not longer than 0.1 second. Therefore, it is predicted that there is a need for generating a high fluid pressure in the pump chamber 204, and that the inlet valve 206 and the discharge valve 208 communicating with the pump chamber 204 are required to have a high response characteristic. However, in this pump accompanied by the passive discharge valve and inlet valve, it is extremely difficult to intermittently discharge a poor-fluidity, high-viscosity rheology fluid with high flow-rate accuracy at high speed.

For coating of an infinitesimal flow rate of high-viscosity fluid, thread-groove type dispensers, which are viscosity pumps, have already been developed into practical use. The thread-groove type dispensers allow preferable results to be obtained in continuous coating by virtue of their permitting a choice of pump characteristics that less depend on nozzle resistance, but are not good at intermittent coating in terms of the characters of the viscosity pumps. Accordingly, the thread-groove type dispensers have conventionally been provided in a constitution that:

(1) an electromagnetic clutch is provided between a motor and a main shaft of a pump, and this electromagnetic clutch is interlocked or opened at the time of discharge-ON or -OFF; or (2) a DC servomotor is used for rapid rotation start or rapid stop.

However, in either case, since the response characteristic is determined by the time constant of the mechanical system, there have been restrictions on high-speed intermittent operation. Also, because of not a few indeterminate factors of rotation characteristics of the main shaft at transient responses (rotation starts and stops), there have been difficulties in strictly controlling the flow rate and limitations in coating accuracy.

In order to solve the aforementioned defects of the air pulse system, the piezo-system employing a laminate piezoelectric actuator, or the thread-groove type pump, the present inventor has already proposed a pump of infinitesimal flow rate in Unexamined Japanese Patent Publication No. 10-128217 (Japanese Patent Application No. 8-289543) described below.

This is to obtain an intake action and a discharge action of the pump by giving relative rectilinear and rotary motions between a piston and a cylinder by means of independent actuators, respectively, and electrically synchronously controlling the operations of the actuators.

In FIG. 20, reference numeral 301 denotes a first actuator constructed of a laminate type piezoelectric element. Reference numeral 302 denotes a piston that is driven by a first actuator 1 and corresponds to the direct-acting portion of the pump. Between this piston 302 and a lower housing 303 is formed, a pump chamber 304 whose capacity is changed by axial movement of the piston 302. In the lower housing 303 are formed an inlet hole 305 and outlet holes 306a, 306b communicating with the pump chamber 304.

Numeral 307 denotes a second actuator for giving relative rotary and swing motions between the piston 302 and the lower housing 303 and is constructed of a pulse motor, a DC servo motor, or the like. Numeral 308 denotes a motor rotor constituting the second actuator 307, while 309 denotes a stator.

A rotary member 310 is connected to the piston 302 via a disc-shaped plate spring 311. In order to transfer to the piston 302 the axial extension or contraction of the piezoelectric element that serves as the first actuator 301, the plate spring 311 has such a shape that it is easily elastically deformed in the axial direction. The rotation of the rotary member 310 is transferred to the piston 302 via the plate spring 311. With this construction, the piston 302 of the pump can simultaneously and independently perform rotary motion and rectilinear motion.

Numeral 312 denotes a coupling joint for supplying electric power from external to the first actuator 301 that performs rotary motion.

At a lower end portion of the lower housing 303, is mounted a discharge sleeve 314 having a discharge nozzle 313 at its tip. On the inner surface of this discharge sleeve 314 is formed a fluid passage 315 for making the outlet holes 306a, 306b and the discharge nozzle 313 communicating with each other. On the relative movement surfaces of the lower housing 303 and the piston 302 are formed fluid passage grooves 316b, 317b that allow the pump chamber 304 to communicate alternately with the inlet hole 305 and with the outlet holes 306a, 306b by the relative rotary motion of the lower housing 303 and the piston 302. These fluid passage grooves play the role of an inlet valve and a discharge valve of normal pumps.

Reference numeral 318 denotes a displacement sensor, while 319 denotes a rotary disc fixed to the piston 302. The axial position of the piston 302 is detected by the displacement sensor 318 and the rotary disc 319. In this proposal, a piezoelectric actuator is used for rectilinear motion and a motor is used for rotary motion.

For the intermittent dispenser according to the above proposal, a piezoelectric actuator is used for rectilinear motion and a motor is used for rotary motion.

In this case, it is required to give an electric power for electromechanical energy conversion via a conductive brush (coupling joint) to the electrodes of the piezoelectric element that is making a rotary motion. A high voltage of several hundred to several thousand volts is necessary for driving the piezoelectric element. Therefore, a large-diameter coupling joint has been needed, and this has led to the issue of an increased number of components and a complicated device. The conductive brush is accompanied by mechanical sliding, and this imposes a serious restriction on increasing the rotating speed.

In the patent specification of the aforementioned dispenser, in order to eliminate the conductive brush, there is proposed a method for arranging the piezoelectric element on the stationary side and rotating only the piston side to transfer an axial displacement of the piezoelectric element to the piston side via a pivot bearing.

However, in this case, a shift with aging of the axial position due to the wearing of the pivot section becomes a serious issue.

Moreover, in the field of circuit formation that has recently been going increasingly higher in accuracy and superfiner in size, or in the fields of electrode and rib formation for PDPs, CRTs, or other image tubes as well as manufacturing process for liquid crystals, optical disks, or the like, there have been such demands related to the fine-coating technique such as:

(1) both continuous and intermittent coating can be met, where, for example, continuous coating can be done and then rapidly stopped and, after a short time, continuous coating can be abruptly started. For this purpose, it is ideal to control the flow rate at an order of, for example, not more than 0.01 second;

(2) in either mode, high-accuracy coating can be implemented, where ultrahigh-speed coating can be implemented in the intermittent mode; and (3) readiness for powder and granular material; for example, such trouble as powder-squeezing breakage and flow passage blockage due to mechanical shutoff of the flow passage is eliminated.

The present invention provides a fluid discharge device which greatly improves the prior art examples and device examples relevant to the infinitesimal flow-rate dispenser, and which meets new demands in the fine coating technique.

That is, by providing relative rectilinear and rotary motions between the piston and the cylinder and besides giving a fluid transport device by rotary motion, a relative gap between its stationary side and rotational side is changed by using the rectilinear motion, by which the fluid discharge rate is controlled.

The present invention enables the obtainment of a fluid discharge device that can discharge and coat, for example, an ultra-small quantity of high-viscosity fluid of poor fluidity with high accuracy at high speed, regardless of intermittent or continuous coating.

SUMMARY OF THE INVENTION

In accomplishing these and other aspects, according to a first aspect of the present invention, there is provided a fluid discharge device which comprises:

a shaft;

a housing in which the shaft is housed, the housing having an inlet port and a discharge port dedicated for a discharge fluid and serving for allowing a pump chamber defined by the shaft and the housing to be communicated with outside;

a device for relatively rotating the shaft and the housing;

an axial drive device for giving an axial relative displacement between the shaft and the housing to change a gap between the shaft and the housing; and a device for pressure-feeding toward a discharge port side the fluid that has flowed into the pump chamber, wherein the gap between the shaft and the housing is changeable by the axial drive device so as to allow a fluid resistance between the pump chamber and the discharge port to be increased or decreased.

According to a second aspect of the present invention, there is provided a fluid discharge device according to the first aspect, wherein the discharge fluid is conductive paste, adhesive, solder cream, or fluorescent material.

According to a third aspect of the present invention, there is provided a fluid discharge device according to the first aspect, wherein an opening of a discharge flow passage communicating with the discharge port is formed both in a discharge-port side end face of the shaft and in a relative movement surface which is a face opposite to the discharge-port side end face.

According to a fourth aspect of the present invention, there is provided a fluid discharge device according to the third aspect, wherein the gap between the shaft and the housing is a gap between the discharge-port side end face of the shaft and its opposing face which is changeable by the axial drive device.

According to a fifth aspect of the present invention, there is provided a fluid discharge device according to the fourth aspect, wherein a shallow groove for pressure-feeding the fluid radially is formed in the relative movement surface of the discharge-port side end face of the shaft.

According to a sixth aspect of the present invention, there is provided a fluid discharge device according to the first aspect, wherein the device for pressure-feeding the fluid toward the discharge-port side is a spiral-shaped groove formed both in an outer peripheral portion of the shaft and in a relative movement surface of an inner surface of the housing which is a face opposite to the outer peripheral portion.

According to a seventh aspect of the present invention, there is provided a fluid discharge device according to the first aspect, further comprising a displacement sensor which detects an axial relative displacement between the housing and the shaft, wherein with a signal of the sensor the axial relative displacement is adjusted by the axial drive device.

According to an eighth aspect of the present invention, there is provided a fluid discharge device according to the first aspect, wherein the axial drive device is moved or expanded and contracted by an electromagnetic contactless electric-power supplied by an electromagnetic contactless electric-power supply device.

According to a ninth aspect of the present invention, there is provided a fluid discharge device according to the first aspect, wherein the axial drive device is a Giant-magnetostrictive element.

According to a tenth aspect of the present invention, there is provided a fluid discharge device according to the first aspect, wherein inside an outer peripheral shaft which is a hollow shaft, is inserted a central shaft which makes relative movement in a direction opposite to the outer peripheral shaft, and a rate of change of size of a space defined by the outer peripheral shaft, a discharge-side end face of the central shaft, and a face opposite to the discharge-side end face is decreased during a move of the outer peripheral shaft.

According to an 11th aspect of the present invention, there is provided a fluid discharge device according to the tenth aspect, wherein the axial drive device is elastically supported at its both end portions, and the outer peripheral shaft and the central shaft are fitted to each of the end portions.

According to a 12th aspect of the present invention, there is provided a fluid discharge device according to the fourth aspect, wherein if a mean particle size of fine particles contained in the fluid is φd and a minimum value of the gap between the discharge-port side end face of the shaft and its opposing face is δ min, then it follows that δ min>φd.

According to a 13th aspect of the present invention, there is provided a fluid discharge device according to the first aspect, wherein the device for pressure-feeding the fluid toward the discharge-port side is a thrust-type groove formed both in an end face of the shaft and in a relative movement surface associated therewith.

According to a 14th aspect of the present invention, there is provided a fluid discharge device according to the first aspect, wherein a void portion is formed in a discharge-side end face of the shaft or in a housing in which the shaft is housed.

According to a 15th aspect of the present invention, there is provided a fluid discharge device according to the first aspect, wherein an area of an axial flow passage between the pump chamber and the discharge port is changed by a relative movement of the shaft and the housing performed by the axial drive device.

According to a 16th aspect of the present invention, there is provided a fluid discharge device according to the first aspect, wherein discharge flow rate is controlled by a combination of fluid resistance control performed by relative movement of the shaft and the housing with the axial drive device and rotational speed control of a motor.

According to a 17th aspect of the present invention, there is provided a fluid discharge method comprising:

controlling discharge flow rate by a combination of rotational speed control of a motor and fluid resistance control performed by relative movement of a shaft and a housing, for housing the shaft, to change a gap between the shaft and the housing so as to allow a fluid resistance between a pump chamber, defined by the shaft and the housing to be communicated with outside, and a discharge port of the housing to be increased or decreased.

According to an 18th aspect of the present invention, there is provided a fluid discharge device according to the eighth aspect, wherein with a rotation transfer shaft extending through a central portion of a cylindrical-shaped Giant-magnetostrictive element, or with a rotating sleeve in which an outer peripheral portion of a solid-shaped Giant-magnetostrictive element is housed, rotation is transferred to the shaft located within the pump chamber.

According to a 19th aspect of the present invention, there is provided a fluid discharge device which comprises:

a shaft;

a housing for housing the shaft, the housing having an inlet port and a discharge port dedicated for a pressurized fluid and serving for allowing a pump chamber defined by the shaft and the housing or by the shaft and the sleeve to be communicated with outside;

a device for rotating the shaft and the housing relative to each other;

a sleeve in which the shaft is housed or which has an opposing face opposing to the shaft at at least part thereof; and an axial drive device placed between the housing and the sleeve or placed on either the housing or the sleeve and serving for giving an axial relative displacement between the shaft and the sleeve, wherein a gap between the shaft and the sleeve is changeable by the axial drive device so that a fluid resistance between the pump chamber and the discharge port can be increased or decreased.

According to a 20th aspect of the present invention, there is provided a fluid discharge device according to the 19th aspect, further comprising a device for pressure-feeding toward a side of the discharge port the fluid that has flowed into the pump chamber.

According to a 21st aspect of the present invention, there is provided a fluid discharge device according to the 19th aspect, wherein an opening of a discharge flow passage communicating with the discharge port is formed both in a discharge-port side end face of the shaft and in a relative movement surface of its opposing face.

According to a 22nd aspect of the present invention, there is provided a fluid discharge device according to the 21st aspect, wherein a gap between the discharge-port side end face of the shaft and its opposing face is changeable by the axial drive device.

According to a 23rd aspect of the present invention, there is provided a fluid discharge device according to the 22nd aspect, wherein a shallow groove for pressure-feeding the fluid radially is formed in the relative movement surface of the discharge-port side end face of the shaft.

According to a 24th aspect of the present invention, there is provided a fluid discharge device according to the 20th aspect, wherein the device for pressure-feeding the fluid toward the discharge-port side is a spiral-shaped groove formed both in an outer peripheral portion of the shaft and in a relative movement surface of a sleeve inner surface, which is an opposing face opposing to the outer peripheral portion of the shaft.

According to a 25th aspect of the present invention, there is provided a fluid discharge device according to the first aspect, further comprising a displacement sensor which detects an axial relative displacement between the sleeve and the shaft, wherein with a signal of the displacement sensor, the axial relative displacement is adjusted by the axial drive device.

According to a 26th aspect of the present invention, there is provided a fluid discharge device according to the 19th aspect, wherein the axial drive device is an electromagnetostrictive element.

According to a 27th aspect of the present invention, there is provided a fluid discharge device according to the 26th aspect, wherein with one end of the electromagnetostrictive element provided as a fixed end and the other end thereof provided as a movable end, the fixed-end side is fixed to the housing while the movable-end side is fixed to the sleeve.

According to a 28th aspect of the present invention, there is provided a fluid discharge device according to the 22nd aspect, wherein if a mean particle size of fine particles contained in the fluid is $\phi d$ and if a minimum value of the gap between the discharge-port side end face of the shaft and its opposing face is $\delta$ min, then it follows that $\delta$ min>$\phi$d.

According to a 29th aspect of the present invention, there is provided a fluid discharge device according to the 26th aspect, wherein high-frequency or ultrasonic vibrations are superimposed on drive of the electromagnetostrictive element.

According to a 30th aspect of the present invention, there is provided a fluid discharge device according to the 19th aspect, wherein a candle motor is used as the device for rotating the shaft and the housing relative to each other and the flow passage for conveyed fluid is defined between a rotor and a stator of the motor.

According to a 31st aspect of the present invention, there is provided a fluid discharge method comprising:

preparatorily programming coating quantities of discharge fluid necessary for individual coating-targeted sites; and controlling a discharge flow rate of the discharge fluid by an axial relative displacement between a shaft and a sleeve for housing the shaft so that a gap between the shaft and the sleeve is changeable by the axial relative displacement so that a fluid resistance between a pump chamber, defined by the shaft and a housing or by the shaft and the sleeve to be communicated with outside, and a discharge port of the housing can be increased or decreased.

According to a 32nd aspect of the present invention, there is provided a fluid discharge device according to the 19th aspect, wherein the sleeve comprises a thrust plate having an opposing face opposing to the shaft, and a discharge nozzle.

According to a 33rd aspect of the present invention, there is provided a fluid discharge device according to the 32nd aspect, wherein the thrust plate is deformed by the axial drive device that gives an axial relative displacement.

According to a 34th aspect of the present invention, there is provided a fluid discharge device according to the 33rd aspect, wherein the axial drive device is an electromagnetic solenoid placed on the housing side.

According to a 35th aspect of the present invention, there is provided a fluid discharge device according to the 33rd aspect, wherein the axial drive device is a photoelectric element placed on the thrust plate.

According to a 36th aspect of the present invention, there is provided a fluid discharge device comprising:

a piston driven in a rectilinear direction by a first actuator;

a housing for housing therein the piston, the housing having an inlet hole and a discharge hole that are provided for a discharge fluid and formed in the housing, a pump chamber that is formed between the piston and the housing and communicates with the inlet hole and the discharge hole;

a cylinder arranged coaxially with the piston; and a second actuator for giving a relative rotary motion between the piston and the cylinder, wherein the relative rotary motion or rectilinear motion of the piston to the cylinder exerts a pumping action on the pump chamber, and the first actuator is moved or extended and contracted externally by an electromagnetic non-contact electric power discharge device.

According to a 37th aspect of the present invention, there is provided a fluid discharge device according to the 36th aspect, wherein the pump chamber is changed in capacity by a movement of the piston.

According to a 38th aspect of the present invention, there is provided a fluid discharge device according to the 36th aspect, wherein an operative portion of the first actuator is integrated with the piston.

According to a 39th aspect of the present invention, there is provided a fluid discharge device according to the 36th aspect, wherein electric power is discharged from outside to the first actuator in a non-contact manner.

According to a 40th aspect of the present invention, there is provided a fluid discharge device according to the 36th aspect, wherein the first actuator is a Giant-magnetostrictive element.

According to a 41st aspect of the present invention, there is provided a fluid discharge device according to the 36th aspect, wherein a flow passage groove for giving a pump intake action or a pump discharge action is formed on relative movement surfaces of the housing and the piston or the cylinder.

According to a 42nd aspect of the present invention, there is provided a fluid discharge device according to the 36th aspect, wherein the rectilinear motion of the first actuator is given in synchronization with the rotary motion of the second actuator by an electric signal.

According to a 43rd aspect of the present invention, there is provided a fluid discharge device according to the 36th aspect, wherein the rotation of the second actuator is a swing motion.

According to a 44th aspect of the present invention, there is provided a fluid discharge device according to the 36th aspect, wherein the second actuator is a scanning motor.

According to a 45th aspect of the present invention, there is provided a fluid discharge method comprising:

opening and closing an inlet port or a discharge port outlet of a flow passage by a relative rotary motion between a piston driven by an electromagnetostrictive actuator and a housing that houses therein the piston; and discharging a discharge fluid by expanding and contracting the electromagnetostrictive actuator externally by supplying electromagnetic non-contact electric power.

According to a 46th aspect of the present invention, there is provided a fluid discharge method according to the 45th aspect, wherein the electromagnetostrictive actuator is comprised of a Giant-magnetostrictive element.

BRIEF DESCRIPTION OF THE DRAWINGS

These and other aspects and features of the present invention will become clear from the following description taken in conjunction with the preferred embodiments thereof with reference to the accompanying drawings, in which:

FIG. 1A is a front sectional view and FIG. 1B is a view showing an end face of the shaft;

FIG. 3A is a front sectional view and FIG. 3B is a view showing an end face of the shaft;

FIG. 7A is a front sectional view and FIG. 7B is a view showing an end face of the shaft;

FIG. 11A is a front sectional view and FIG. 11B is a view showing an end face of the shaft;

FIG. 12A is a front sectional view and FIG. 12B is a view showing an end face of the shaft;

FIG. 15A is a model diagram showing a discharge-ON state and FIG. 15B is a model diagram showing a discharge-OFF state;

FIG. 16A is a chart showing the relationship between the rotational speed of the motor and time and FIG. 16B is a chart showing the relationship between the gap of the thrust end face gap and time;

DETAILED DESCRIPTION OF THE PREFERRED EMBODIMENTS

Figure 1A:
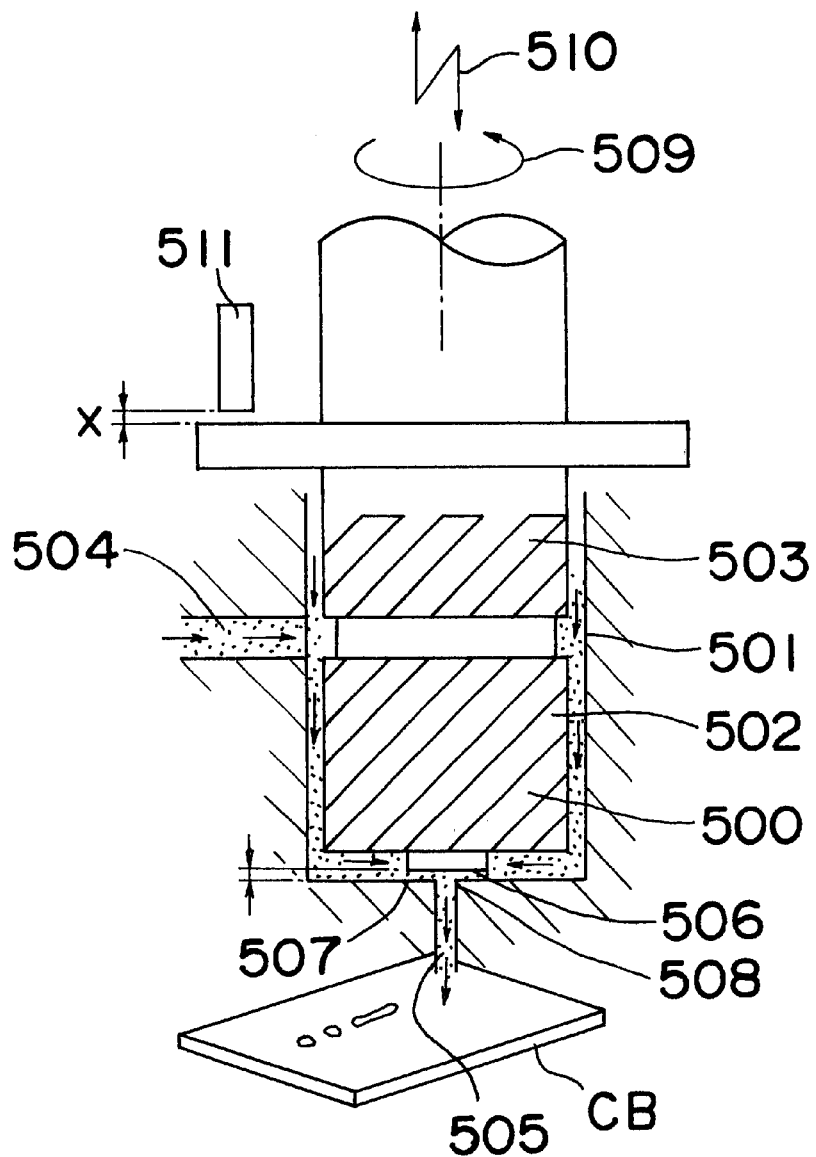
FIGS. 1A and 1B are model diagrams showing the principle of the present invention, where

Before the description of the present invention proceeds, it is to be noted that like parts are designated by like reference numerals throughout the accompanying drawings.

Hereinbelow, embodiments of the present invention are described in the following two divisions:

I. "continuous and intermittent type" dispensers with a viscosity pump; and

II. "intermittent" dispensers with a positive displacement pump.

The division I is described with first to 12th embodiments, and the division II is described with a 13th embodiment.

(First Embodiment)
(Description of Principle of the Present Invention (1))

Before the detailed description of a first embodiment of the present invention is started, the principle of the present invention (1) is described with reference to FIGS. 1A and 1B.

Figure 1B:
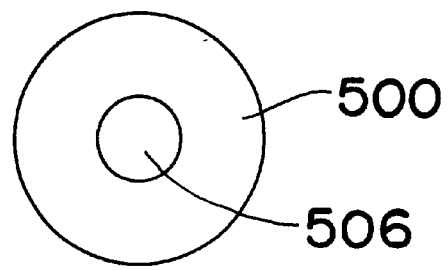

Referring to FIG. 1A, reference numeral 500 denotes a shaft, 501 denotes a sleeve, 502 denotes a radial groove formed in the shaft 500 for use of pressure feed of discharge fluid, 503 denotes a sealing radial groove, 504 denotes an inlet port, and 505 denotes a discharge nozzle. As shown in FIG. 1B, 506 denotes a thrust end face protrusively formed on the discharge-side end face of the shaft 500, while an opening 508 of the discharge nozzle 505 is formed in a face 507 opposite to the thrust end face 506.

The radial groove 503 is one which has been known as a spiral groove hydrodynamic bearing, and is used also as a thread groove pump.

Reference numeral 509 denotes a motor for giving rotation to the shaft 500. Numeral 510 denotes an axial drive device for imparting an axial reciprocating motion to the rotating shaft 500.

With the use of, for example, a Giant-magnetostrictive element, electric power for expanding and contracting the rotating shaft can be supplied externally in a non-contact manner (the motor and the Giant-magnetostrictive element are unshown).

When the gap δ between the thrust end face 506 and its opposing face 507 is large enough, the discharge rate is not affected by this gap δ. That is, the discharge rate is determined by radial-groove parameters (groove depth, radial gap, groove angle, etc.), rotational speed, fluid viscosity, and the fluid resistance of the discharge nozzle 505.

For reduction of the fluid discharge rate, while the shaft 500 is kept rotating, the thrust end face 506 of the rotary shaft is brought closer to the stationary-side opposite face 507 by using the axial positioning device 510. With the gap δ reduced, viscosity resistance R between the outer periphery of the thrust end face 506 and the discharge nozzle opening 508 rapidly increases in inverse proportion to the triple of the gap δ as shown by the following equation:

$$R = \frac{P}{Q} = \frac{6\mu}{\pi\delta^3} \ln\frac{R_o}{R_i} \tag{1}$$

In Equation (1), P is a pressure difference between inner and outer peripheries of the thrust end face 506, Q is a flow rate, μ is a viscosity coefficient of the fluid, $R_o$ is an outer diameter of the thrust end face 506, and $R_i$ is a radius of the discharge nozzle opening 508.

By detecting an axial position x with a displacement sensor 511, and by performing the axial positioning so that the gap δ is maintained at a smallest possible state (several μm), the fluid discharge rate can be lowered to a negligible level while the rotating state is maintained and while the non-contact state is held.

Consequently, in this invention, a "non-contact seal" is provided between a rotary member and a stationary member by making use of the viscous fluid's nonlinearity of "gap—flow rate characteristic," i.e., its characteristic that the fluid resistance is inversely proportional to the triple of the gap.

Attention is focused on the fact that because a small increase of the gap δ causes the fluid resistance to largely increase, the stroke of the axial positioning device is small enough, having only to be not more than several tens of microns. Therefore, for example, using a Giant-magnetostrictive element or a piezoelectric element as an actuator to be used for the axial positioning device makes it possible to perform a prompt move from a continuous coating state to a coating halt, or from a half state to continuous coating.

(Detailed Description of First Embodiment)

Figure 2:
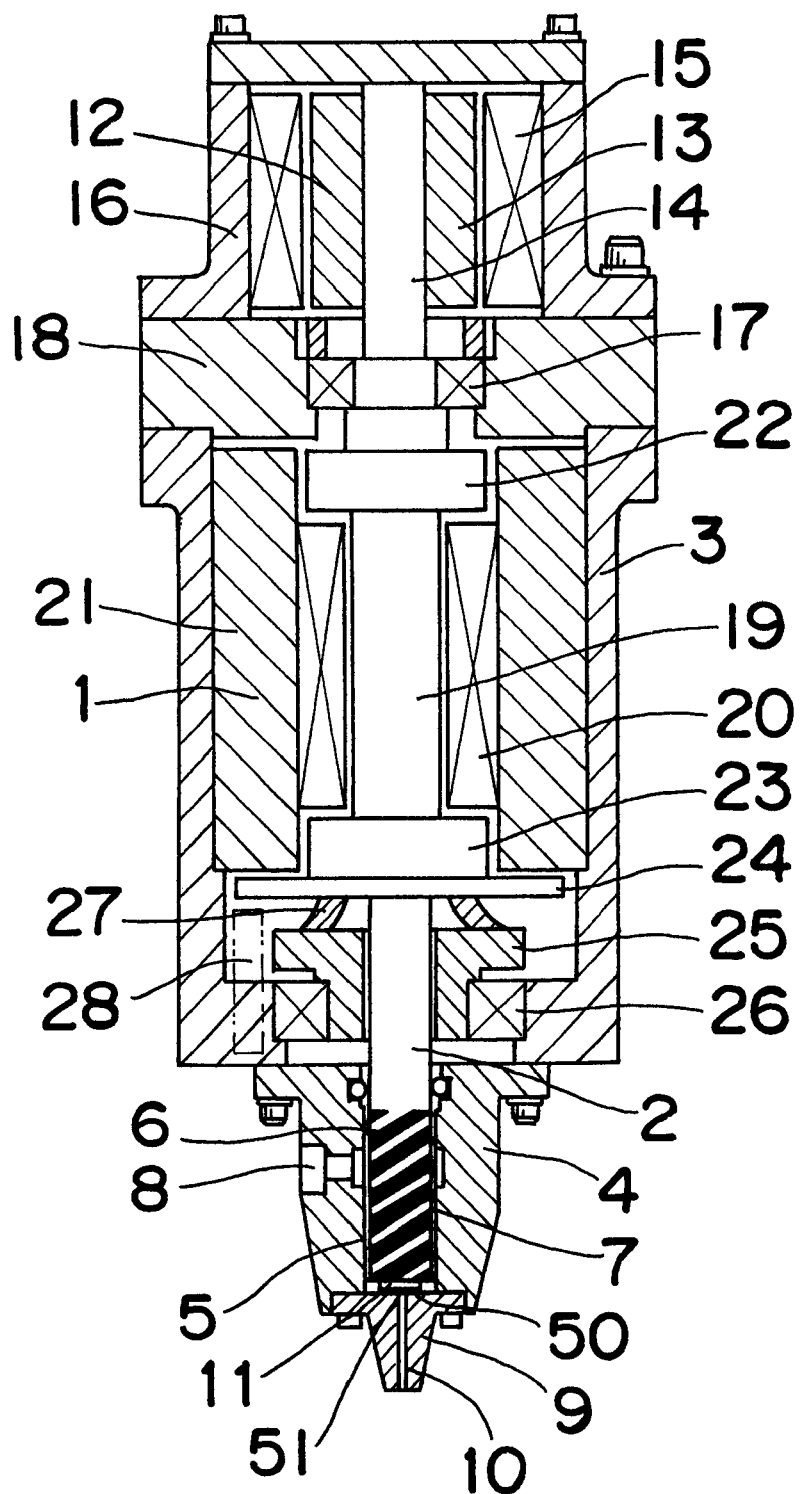
FIG. 2 is a front sectional view showing a dispenser according to a first embodiment of the present invention.

The first embodiment in which the present invention is applied to a dispenser for surface mounting of electrical components is described below with reference to FIG. 2.

Reference numeral 1 denotes a first actuator, which is formed from an electromagnetostrictive actuator of a Giant-magnetostrictive element or the like, an electrostatic actuator, an electromagnetic solenoid, or the like.

In this first embodiment, there is employed a Giant-magnetostrictive element capable of obtaining a high degree of positioning accuracy, having a high response characteristic, and obtaining a large output load in order to intermittently feed an infinitesimal quantity of high-viscosity fluid (discharge fluid) at high speed with a high degree of accuracy. Numeral 2 denotes a main shaft driven by the first actuator 1. The first actuator is housed in a housing 3, and a cylinder 4 for housing the main shaft 2 therein is fitted to a lower end position of the housing 3. Numeral 5 denotes a radial groove formed on the outer surface of the main shaft 2 and serving for pressure feed of the fluid to the discharge side, and 6 denotes a radial groove for use of sealing.

Between the main shaft 2 and the cylinder 4, is formed a pump chamber 7 for fulfilling a pumping action by relative rotation of the main shaft 2 and the cylinder 4. Also, in the cylinder 4 is formed an inlet hole 8 communicating with the pump chamber 7. Numeral 9 denotes a discharge nozzle fitted to the lower end portion of the cylinder 4, where a discharge hole 10 is formed at a central portion of the nozzle. Numeral 11 denotes a discharge-side thrust end face of the main shaft 2, where an opening 51 is formed in a face 50 opposite to the thrust end face 11.

Reference numeral 12 denotes a second actuator, which imparts a relative rotary motion between the main shaft 2 and the cylinder 4.

A motor rotor 13 is fixed to an upper main shaft 14, and a motor stator 15 is housed in a housing 16. This upper main shaft 14 is supported on a ball bearing 17, and the outer-ring side of this ball bearing 17 is housed in a housing 18.

Reference numeral 19 denotes a Giant-magnetostrictive rod formed of a Giant-magnetostrictive element, and this Giant-magnetostrictive rod 19 is tightened (connected) at its upper part to the upper main shaft 14 and tightened (connected) at its lower part to the main shaft 2.

Reference numeral 20 denotes a magnetic field coil for producing a magnetic field lengthwise of the Giant-magnetostrictive rod 19. Numeral 21 denotes a permanent magnet for providing a bias magnetic field, and the permanent magnet 21 is in the housing 3.

This permanent magnet 21 preparatorily applies a magnetic field to the Giant-magnetostrictive rod 19 to elevate the working point of a magnetic field. This magnetic bias allows the linerarity of Giant-magnetostriction against magnetic field strength of be improved. Numeral 23 denotes a cylindrical-shaped yoke member A, and 23 denotes a yoke member B having a thin thrust disc 24 at its lower portion. A loop of 19→22→21→23→19 forms a closed-loop magnetic circuit for controlling the expansion and contraction of the Giant-magnetostrictive rod 19, while a loop 19→22→21→23→19 forms a closed-loop magnetic circuit for producing a bias magnetic field.

Consequently, the members 19–23 constitute a known Giant-magnetostrictive actuator 1 that can control the axial expansion and contraction of the Giant-magnetostrictive rod 19 with an electric current fed to the magnetic field coil.

The Giant-magnetostrictive material is an alloy of a rare earth element and iron, known examples thereof including $TbFe_2$, $DyFe_2$, $SmFe_2$, etc., which have been under rapid development into practical use in recent years.

Reference numeral 25 denotes a sleeve press-fitted to the inner-ring side of a ball bearing 26, and the outer-ring side of the ball bearing 26 is housed in the housing 3. Numeral 27 denotes a bias spring fitted between the thrust disc 24 and the sleeve 25.

This bias spring 27 normally applies a compressive stress to the Giant-magnetostrictive rod 19 axially (upward in FIG. 1A). This solves the drawback of the Giant-magnetostrictive element which is vulnerable to tensile stress upon occurrence of repeated stress.

The bias spring 27 also has radial rigidity against the main shaft 2. Therefore, although the main shaft 2 and the Giant-magnetostrictive rod 19 are freely rotatable under support by the two ball bearings 17, 26, the center position of the axis composed of the members 2, 19, 14 can be regulated with high rigidity. Thus, with the above construction, in the fluid rotating device of the first embodiment of the present invention, the main shaft 2 of the pump is enabled to control both the rotary motion and the rectilinear motion of minute displacement concurrently and independently.

Further in the first embodiment, in which the Giant-magnetostrictive element is employed as the first actuator, a driving force for causing the rectilinear motion of the Giant-magnetostrictive rod 19 (and the main shaft 2) can be provided externally in a non-contact manner.

Reference numeral 28 denotes a displacement sensor mounted on the housing 3, and the axial absolute position of the main shaft 2 is detected by this displacement sensor 28 and the thrust disc 24.

When the Giant-magnetostrictive element is employed as the first actuator 1, input current and displacement of the Giant-magnetostrictive element are proportional to each other, and therefore, the axial positioning control of the main shaft 2 can be fulfilled even by open loop control without any displacement sensor. However, if the position detecting device as in the first embodiment is provided for the execution of feedback control, hysteresis characteristic of the Giant-magnetostrictive element can be improved, so that higher-accuracy positioning can be executed.

By using this positioning function, the gap δ between the discharge-side thrust end face 11 of the main shaft 2 and its opposing stationary-side face 50 can be controlled.

As described in the Principle of the present invention (1), for pumps which handle minute flow rates, the stroke of gap δ for fulfilling a "non-contact seal" has only to be on the order of, for example, several tens of microns, where stroke limitations of the Giant-magnetostrictive element, piezoelectric element or the like do not matter.

Also, when a high-viscosity fluid is discharged, occurrence of a large discharge pressure due to the pumping action by the radial groove is predicted. In this case, since the first actuator 1 is required to exert a large thrust force against a high fluid pressure, an electromagnetostrictive actuator capable of easily outputting a force of several hundreds to several thousands newtons is preferred.

Instead of using the bias spring 27 to regulate the radial position of the piston main shaft 2, a slide bearing may be formed between the inner surface of the sleeve 25 and the main shaft 2 to radially support the main shaft 2. Also, the inner surface of the sleeve 25 and the main shaft 2 may be so structured as to be relatively free in the axial direction but is regulated in the rotational direction.

In the first embodiment, the Giant-magnetostrictive element is used as the axial driving device.

In this constitution, since the overall construction is much simpler than that of the conventional proposal (Japanese Patent Application 08-289543), the moment of inertia at the operating part can be minimized, allowing the dispenser to be reduced in diameter. Also, in comparison with the case where a piezoelectric element is used, since the conductive brush can be omitted, the load on the motor (rotating device) can be reduced. The electromagnetostrictive element, by virtue of having a sufficiently high response characteristic of not lower than several megahertz, exhibits high response characteristics for rectilinear motion. As a result, the discharge rate of high-viscosity fluid can be controlled at high response and high accuracy.

(Second Embodiment)
(Description of Principle of the Present Invention (2))

A general description of the second embodiment, which is further improved over the first embodiment, is given below with reference to FIGS. 3A to 6.

In the first embodiment, the reduction of discharge rate has been executed by positioning the main shaft so that the fluid resistance of the flow passage leading to the discharge nozzle becomes as large as possible at an end of discharge, i.e., the gap δ of the thrust end face becomes smaller.

In this case, however, because of incompleteness of passage shutoff, some extent of leaks cannot be avoided in processes of low-viscosity conveyed fluid, or in such cases where a long standby time from an end of one coating process to the next coating process is involved. Normally, when a small amount of leak is involved, the fluid that has flowed out from the discharge nozzle is deposited at the tip of the discharge nozzle by surface tension, increasingly expanding like a ball. Application work on a mounting board or the like, if done in this state, would lead to such trouble as thread-forming and dropping.

Also, when the coating fluid is a powder and granular material containing fine particles such as a fluorescent substance or an electrically conductive capsule, making the gap δ of the thrust end face smaller than the outer diameter of the powder and granular material would cause the powder to be mechanically squeezed and broken, which might in some cases cause the dispenser body to be damaged.

The second embodiment, which has been greatly improved in this issue, makes it possible to provide a complete shutoff of any leaking passage at a discharge-OFF even when the coating fluid is a powder and granular material containing fine particles, so that very sharp coating work free from thread-forming and dropping can be achieved.

Figure 3A:
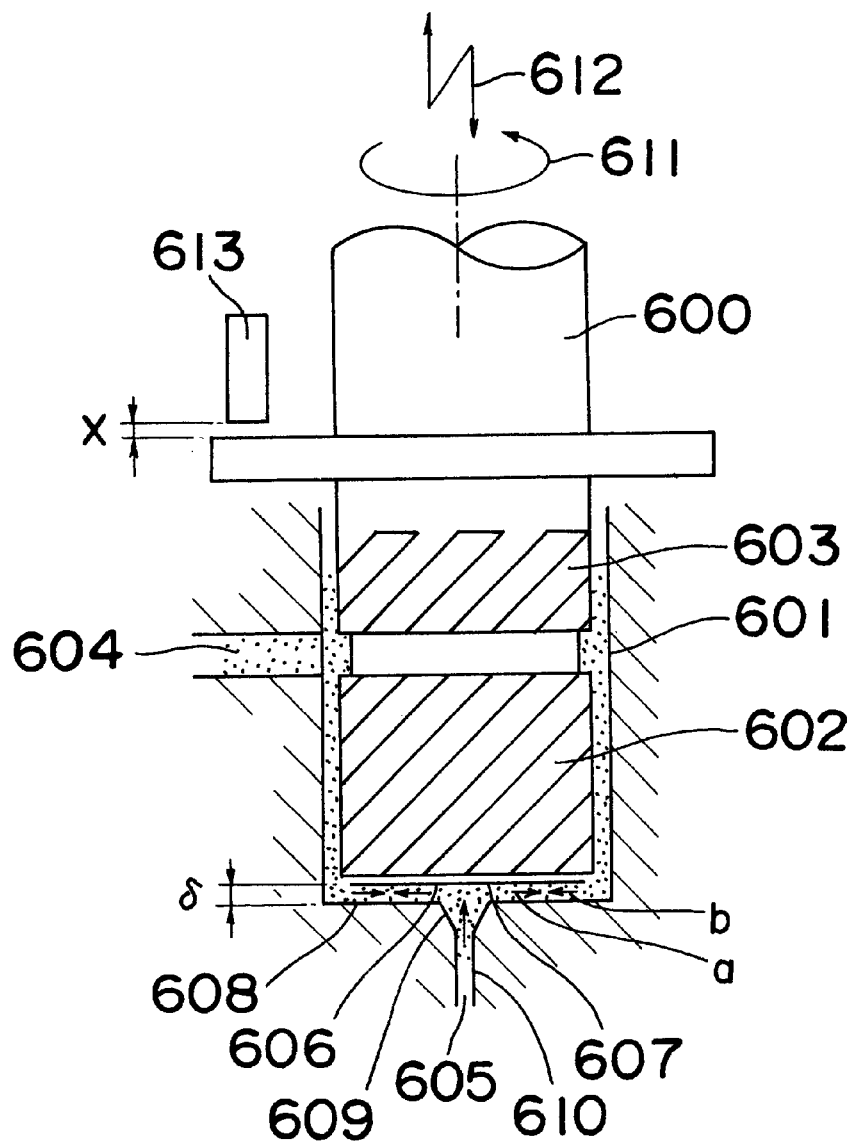
FIGS. 3A and 3B are model diagrams showing the principle of the present invention, where

Referring to FIG. 3A, reference numeral 600 denotes a shaft, 601 denotes a sleeve, 602 denotes a radial groove formed in the shaft 600 for use of pressure feed of fluid, 603 denotes a sealing radial groove, 604 denotes an inlet port, 605 denotes a discharge port, 606 denotes a discharge-side end face of the shaft 600, and 607 denotes a sealing thrust groove formed on the end face 606. A discharge-nozzle opening 609 and a discharge nozzle 610 are formed on a face 608 opposite to the thrust end face 606.

The radial groove 602 is one which is known as a spiral groove dynamic bearing as in the first embodiment, and is used also as a thread groove pump. The sealing thrust groove 607 is one which is known normally as a herringbone thrust dynamic bearing.

Reference numeral 611 denotes a motor for giving rotation 611A to the shaft 600. Numeral 612 denotes an axial drive device for performing axial positioning 612A with an output x of a displacement sensor 613 on the rotating shaft 600, being provided by, for example, a Giant-magnetostrictive element, a piezoelectric element, or the like as in the first embodiment (motor and elements are unshown in detail).

The gap δ of the thrust end face 606 can be controlled to any arbitrary value by the displacement sensor 613, the axial drive device 612, and control and drive circuits (not shown) disposed outside.

FIGS. 4A–5B explain in model illustration that the discharge passage is completely opened or completely shut off by changing the gap δ.

Figure 4A:
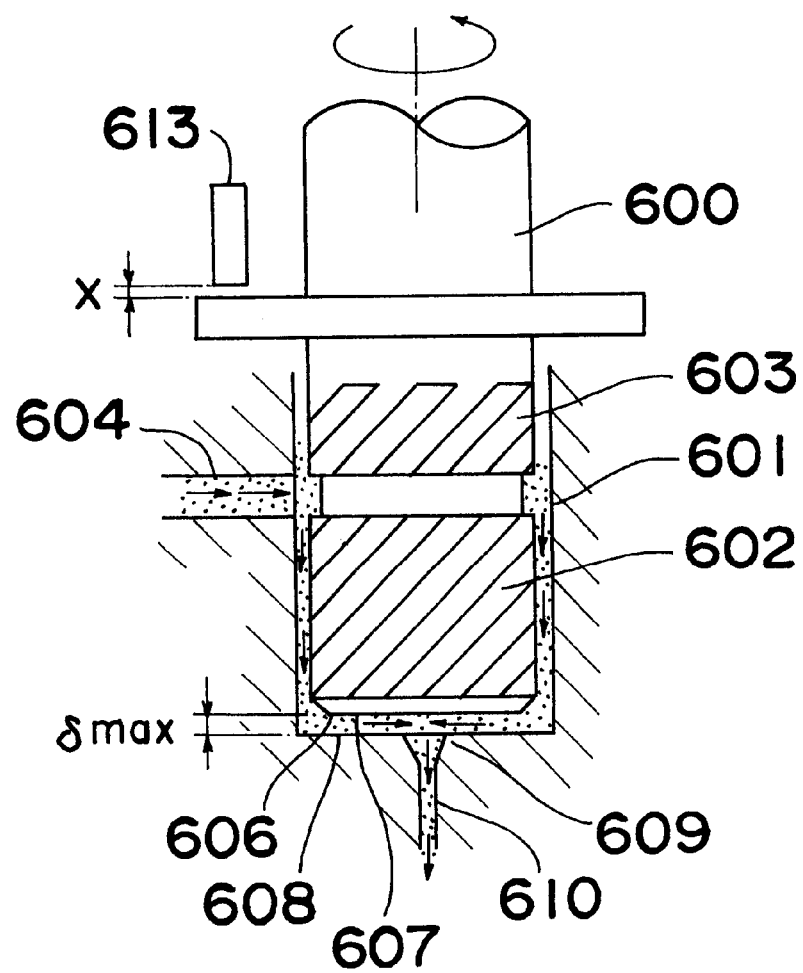
FIGS. 4A and 4B are model diagrams showing a discharge-ON state in the principle of the present invention.
Figure 4B:
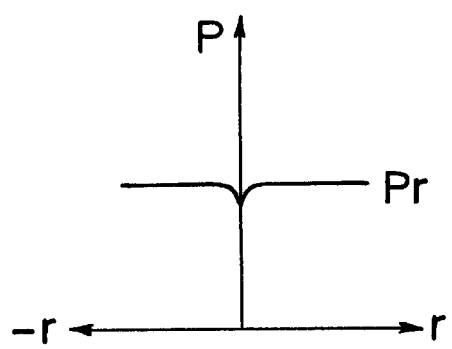

FIGS. 4A and 4B show a case where the gap δ is large enough that the discharge passage is opened with almost no effects of the sealing thrust groove 607. In this case, given that a pumping pressure of the radial groove 602 is Pr, then the pressure P in the vicinity of the opening 609 of the discharge nozzle 610 becomes P≈Pr.

Figure 5A:
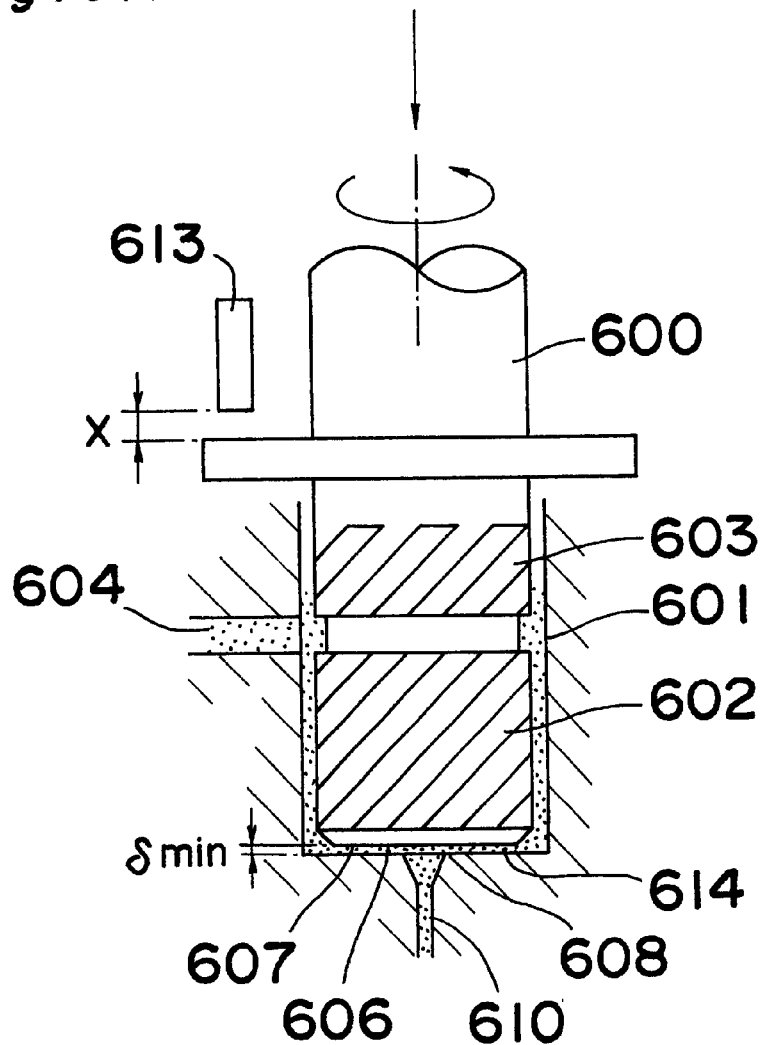
FIGS. 5A and 5B are model diagrams showing a discharge-OFF state in the principle of the present invention.
Figure 5B:
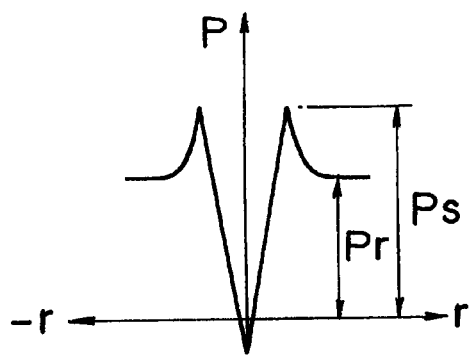

FIGS. 5A and 5B show a case where the gap δ is small enough that the discharge passage is shut off by the effect of the sealing thrust groove 607. In this case, a large sealing pressure Ps is generated by the effect of the herringbone thrust dynamic bearing, where Ps>Pr (pumping pressure of radial groove), so that there is no radial flow of the fluid.

The fluid in the vicinity of the opening 609 of the discharge nozzle 610, receiving a centrifugal pumping action (indicated by arrow "a" in FIG. 3A) by the sealing thrust groove 607, has a negative pressure (below the atmospheric pressure). By this effect, the fluid remaining inside the discharge nozzle 610 is sucked to the pump inside again. As a result, there occur no fluid bodies due to surface tension at the tip of the discharge nozzle 610, thus eliminating the occurrence of thread-forming and dropping.

The sealing pressure generated on the thrust bearing can be given by the following equation:

$$P = f \frac{\omega}{\delta^2}(R_0^4 - R_i^4) \quad (2)$$

In Equation (2), ω is a rotational angular velocity, $R_0$ is an outer diameter of the thrust bearing, $R_i$ is an inner diameter of the thrust bearing, f is a function that is determined by groove depth, groove angle, and groove width, and ridge width.

Figure 3B:
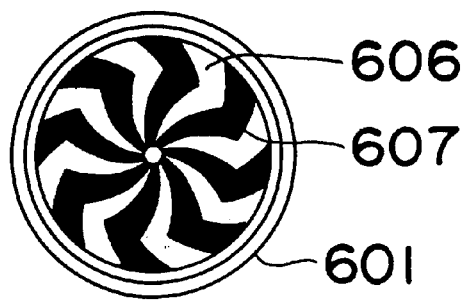
Figure 6:
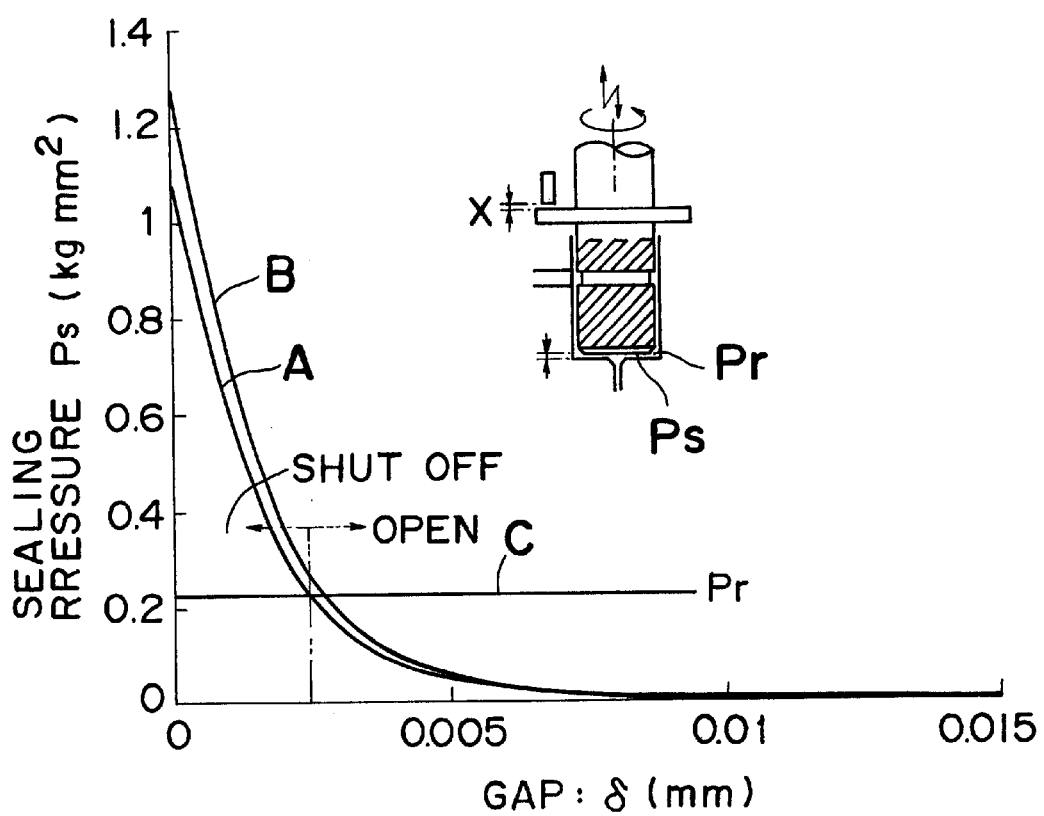
FIG. 6 is a chart showing the relationship between sealing pressure and gap in the principle of the present invention.

A curve A in the graph of FIG. 6 represents characteristics of the sealing pressure Ps versus gap δ when the herringbone type thrust groove of FIG. 3B is used under the conditions of Table 1 shown below.

A curve C in the graph of FIG. 6 is an example showing the relationship between the pumping pressure of the radial groove and the gap δ of the shaft tip with no axial flow. This pumping pressure of the radial groove may be selected at a wide range depending on the selection of radial gap, groove depth, and groove angle as in the thrust groove. Qualitatively, however, the pumping pressure Pr of the radial groove does not depend on the magnitude of the void at the shaft tip (i.e., magnitude of the gap δ).

With a sufficiently large gap δ of the sealing thrust groove, for example, with a gap δ=10 μm, generated pressure is quite small, as less as P<0.01 kg/mm².

While the shaft is kept rotating, an end face of the rotating shaft is made closer to the stationary-side opposite surface. As the gap δ becomes 3–4 μm, the sealing pressure generated on the thrust groove 506 rapidly increases. With δ<2.5 μm, the sealing pressure becomes higher than the pumping pressure of the radial groove, shutting off the outflow of fluid toward the discharge side.

Therefore, in the first embodiment of the present invention, the ON/OFF state of fluid discharge can freely be controlled by moving the rotating shaft axially only to an extent of 10 μm or so.

In summary, the gist of the present invention lies in that the sealing pressure by the thrust groove rapidly increases with decreasing the gap δ while the pumping pressure of the radial groove is quite obtuse to changes in the gap δ.

It is noted that the radial groove or the thrust groove may be formed on either rotational or stationary side.

When such a powder and granular material as an adhesive containing fine particles is coated, a minimum value δ min of gap δ may appropriately be set larger than a fine particle size φd.

$$\Delta \min > \phi d \quad (3)$$

An even larger gap for the same generated pressure can be obtained by increasing the rotational speed or by selecting a large radius of the thrust groove 506 as well as appropriate values for groove depth, groove angle, etc.

Also, when the end face of the rotary shaft is provided with a collar larger than the shaft diameter of the rotary shaft and further grooves are formed on both the collar and the relative-movement surface on the discharge side, a larger gap δ can be maintained for the same generated pressure (not shown).

TABLE 1

| Parameter | | Symbol | Set value |
|---|---|---|---|
| Rotational speed | | N | 400 rpm |
| Viscosity coefficient of fluid | | μ | 1000 cps |
| Sealing thrust groove | Groove depth | hg | 5 μm |
| | Radius | $R_o$ | 2.5 mm |
| | | $R_i$ | 1.0 mm |
| | Groove angle | α | 30 deg |
| | Groove width | bg | 1.0 mm |
| | Ridge width | br | 1.0 mm |

(Detailed Description of Second Embodiment)

A concrete mode for carrying out the second embodiment of the present invention (2) is similar to the first embodiment (FIG. 2) except vicinities of the thrust groove at the shaft tip. Therefore, detailed description is omitted.

(Third Embodiment)

(Description of Principle of Present Invention (3))

A general description of the third embodiment of the present invention (3), which is further improved over the first and second embodiments, is given below with reference to FIGS. 7A to 9.

In the first and second embodiments, the methods have been shown in which the discharge ON/OFF state is controlled by changing the gap at the thrust end face by axially moving the rotary shaft.

In a coating process where the dispenser of the present invention is used, when the time interval between ON and OFF states of discharge is set to the shortest possible one to improve the cycle time of production, in some cases, it is possible to occur issues as follows.

With reference to FIGS. 5A and 5B for the second embodiment, for example, when the shaft 600 is rapidly lowered to turn OFF the discharge state, a space 614 in the vicinity of a shaft end portion between the shaft 600 and the sleeve 601 is rapidly reduced. As a result, a fluid 614 present between the discharge-side end face 606 and its opposite face 608 of the shaft 600 is increased in pressure by compressing action or the so-called squeeze action effect. Since the radial groove 602 communicates with the low-pressure intake side, the high-pressure fluid escapes toward the intake side, so that the original pumping pressure Pr of the steady state is recovered with a time elapse.

However, while the pressure is increasing, the discharge flow rate of outflow through the discharge nozzle 609 increases, which makes an error factor for a required coating amount.

The third embodiment, which has been improved in this issue, has solved the effects of pressure changes of the shaft end portion at rapid downs or rapid ups on the coating accuracy. The third embodiment enables a quick complete shutoff of the leak passage at a discharge OFF, so that a very sharp, high-speed and high-accuracy coating free from thread-forming and dropping can be achieved.

Figure 7A:
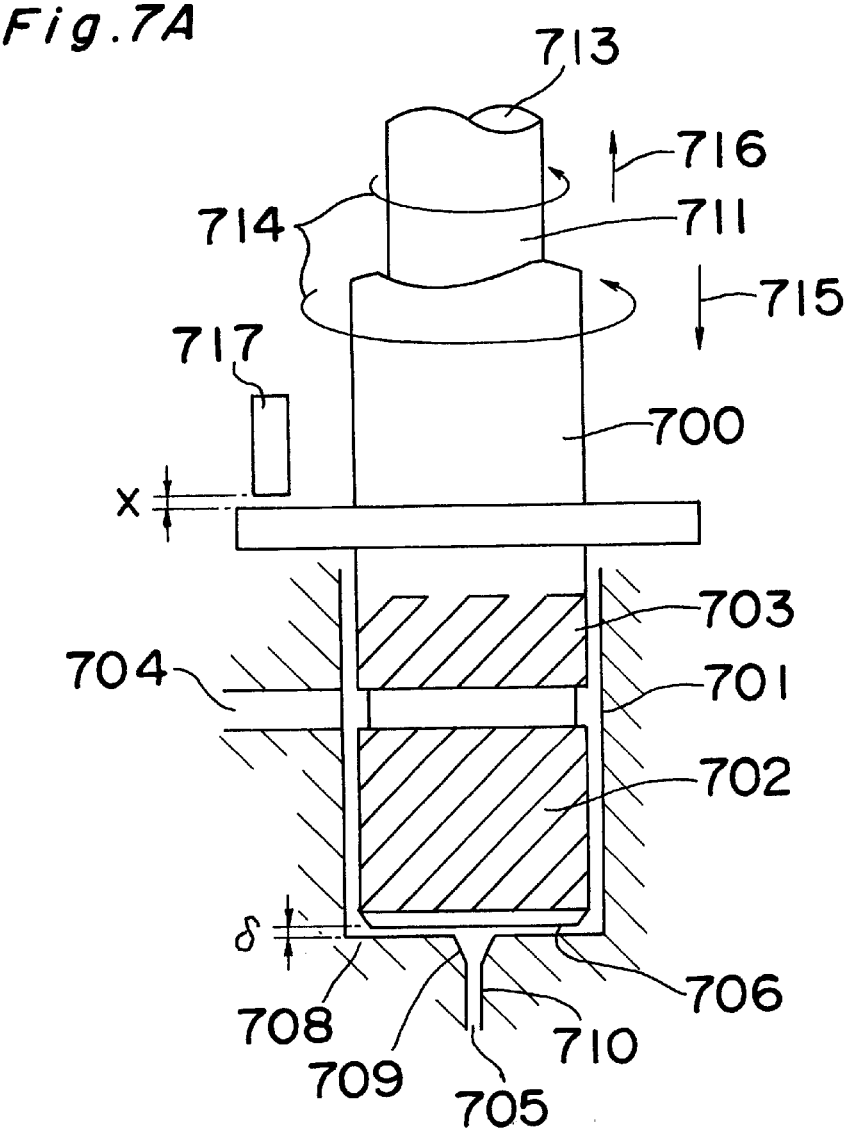
FIGS. 7A and 7B are model diagrams showing the principle of the present invention, where

Referring to FIG. 7A, reference numeral 700 denotes an outer peripheral shaft, 701 denotes a sleeve, 702 denotes a radial groove formed in the outer peripheral shaft 700 for use of pressure feed of fluid, 703 denotes a sealing radial groove, 704 denotes an inlet port, 705 denotes a discharge port, 706 denotes a discharge-side end face of the outer peripheral shaft 700, and 707 denotes a sealing thrust groove formed on the end face 706. A discharge-nozzle opening 709 and a discharge nozzle 710 are formed on a face 708 opposite to the thrust end face 706.

The radial groove 702 is one which is known as a spiral groove dynamic bearing as in the first and second embodiments, and is used also as a thread groove pump. The sealing thrust groove 707 is one which is known normally as a spiral-groove thrust dynamic bearing.

Reference numeral 711 denotes a central shaft, which is inserted inside the hollow outer peripheral shaft 700 so as to be relatively movable in the axial direction thereof. A discharge-side end portion 712 of the central shaft 711 faces the opening 709 of the discharge nozzle 710. The opposite side of the central shaft 711 is fixed to another movable side of a later-described Giant-magnetostrictive element. Therefore, the outer peripheral shaft 700 and the central shaft 711 make motions in opposite directions with respect to the absolute coordinate system with discharge OFF.

Reference numeral 714 denotes a motor for giving rotation 714A to the shaft 700, and rotates both the outer peripheral shaft 700 and the central shaft 711. Numerals 715 and 716 denote an axial drive device for performing axial positioning 715A, 716A with an output x of a displacement sensor 717 on the rotating outer peripheral shaft 700, being provided by, for example, a Giant-magnetostrictive element as in the first embodiment (motor and Giant-magnetostrictive element are unshown in detail). The gap $\delta$ of the thrust end face can be controlled to any arbitrary value by the displacement sensor 717, the axial drive device 715, and control and drive circuits (not shown) disposed outside.

Figure 8:
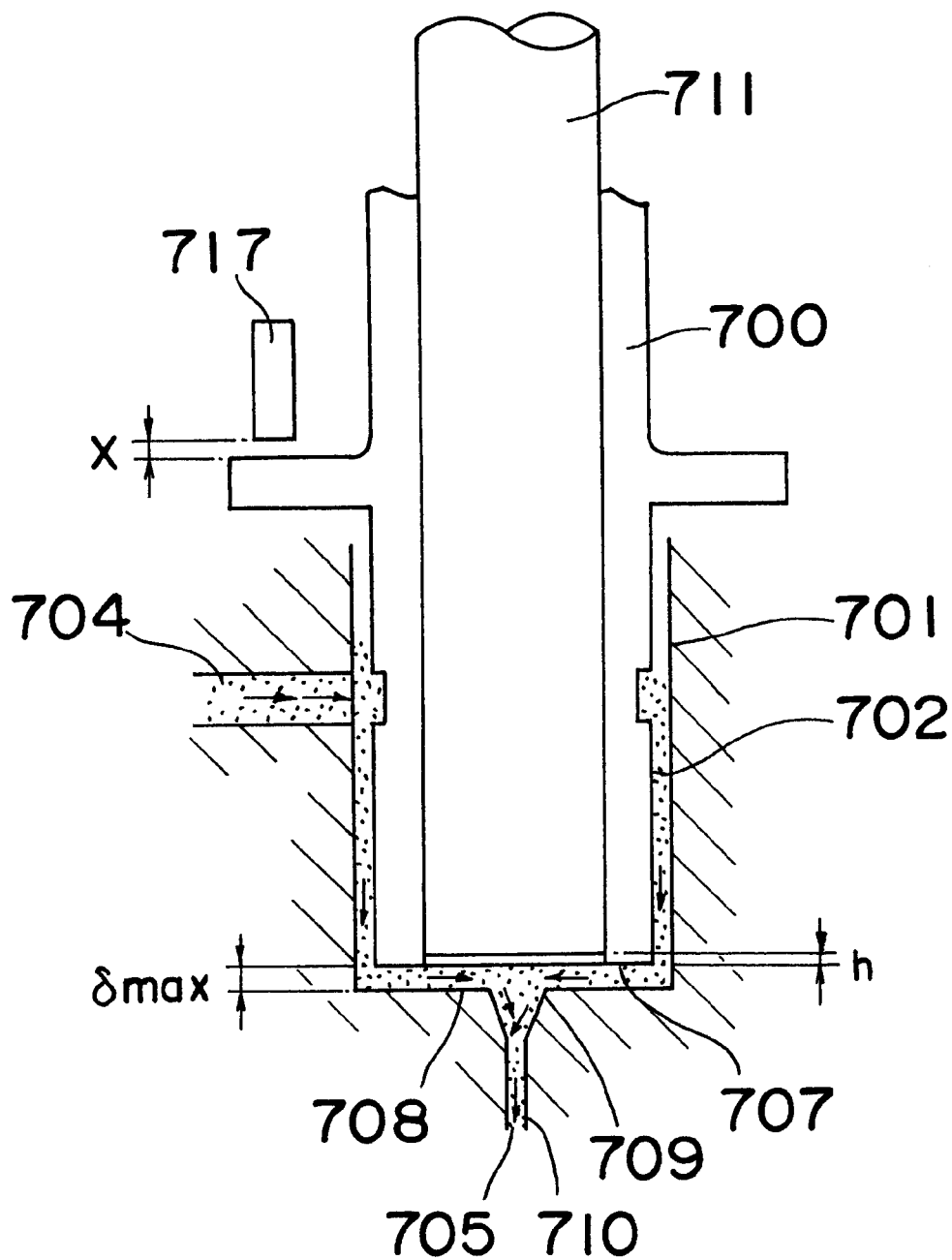
FIG. 8 is a model diagram showing a discharge-ON state in the principle of the present invention.
Figure 9:
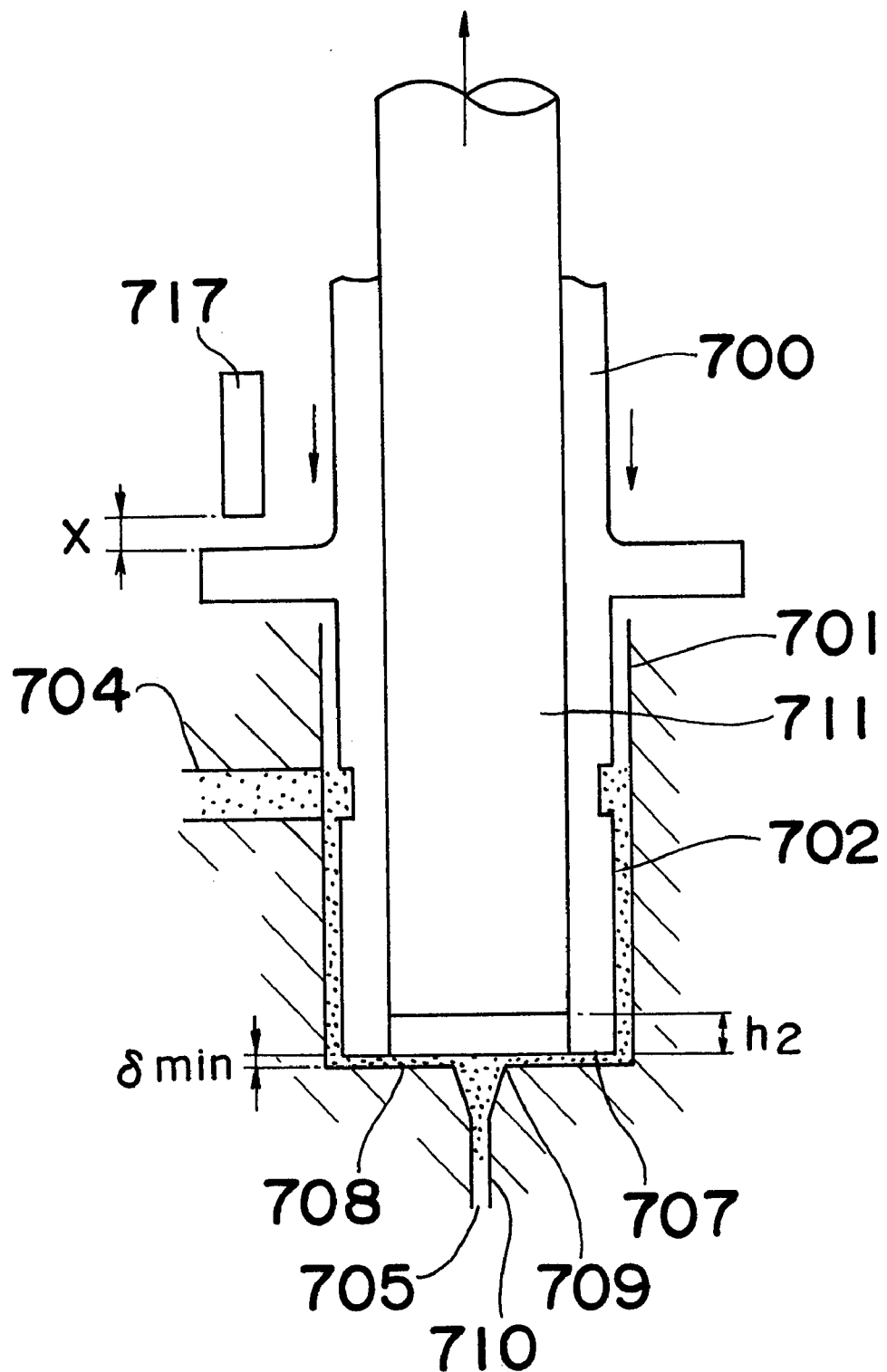
FIG. 9 is a model diagram showing a discharge-OFF state in the principle of the present invention.

FIGS. 8 and 9 explain in model illustration that the discharge passage is completely opened or completely shut off by changing the gap $\delta$, and that the size of the space defined by the outer peripheral shaft, the discharge-side end face of the central shaft, and the opposite face 708 is unchanged.

FIG. 8 shows a case where the gap $\delta$ is large enough that the discharge passage is opened with almost no effects of the sealing thrust groove 707. In this case, given that a pumping pressure of the radial groove 702 is Pr, then the pressure P in the vicinity of the opening 709 of the discharge nozzle becomes P≈Pr.

A capacity V of the space defined by the discharge-side end face of each shaft and its opposing face 708 in this case is determined by a gap $\delta$ max between the outer peripheral shaft 700 and its opposing face and a difference $h_1$ in end-face position between the outer peripheral shaft 700 and the central shaft 711.

FIG. 9 shows a state in which the outer peripheral shaft 700 has been lowered from the state of FIG. 8 by the axial drive device 715. In this case, the central shaft 711 moves up along with the outer peripheral shaft 700.

In this case, the gap $\delta$ is small enough that the discharge passage is shut off by the effect of the sealing thrust groove. Also, a large sealing pressure Ps is generated by the effect of the spiral groove dynamic bearing, so that there is no radial flow of the fluid.

Meanwhile, the gap between the outer peripheral shaft 700 and its opposing face decreases as $\delta$ max $\rightarrow \delta$ min, and the difference in end-face position between the outer peripheral shaft 700 and the central shaft 711 increases as $h_1 \rightarrow h_2$, thus the total capacity V being constant. Therefore, any pressure increase of the fluid due to compressing action or squeeze action effect can be suppressed.

This applies also to cases where the outer peripheral shaft 700 is rapidly moved up to start an outflow of the fluid.

Therefore, with the dispenser of this embodiment, a high discharge flow-rate accuracy can be obtained even in high-speed operation.

Figure 7B:
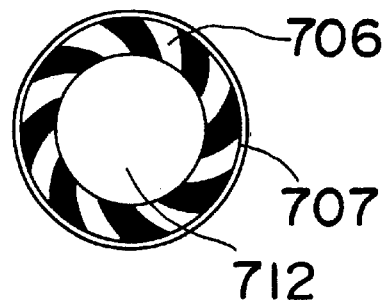

A generated-pressure characteristic of the dynamic thrust bearing of FIG. 7B versus the gap $\delta$ is shown in a graph B of FIG. 6.

(Detailed Description of Third Embodiment)

Figure 10:
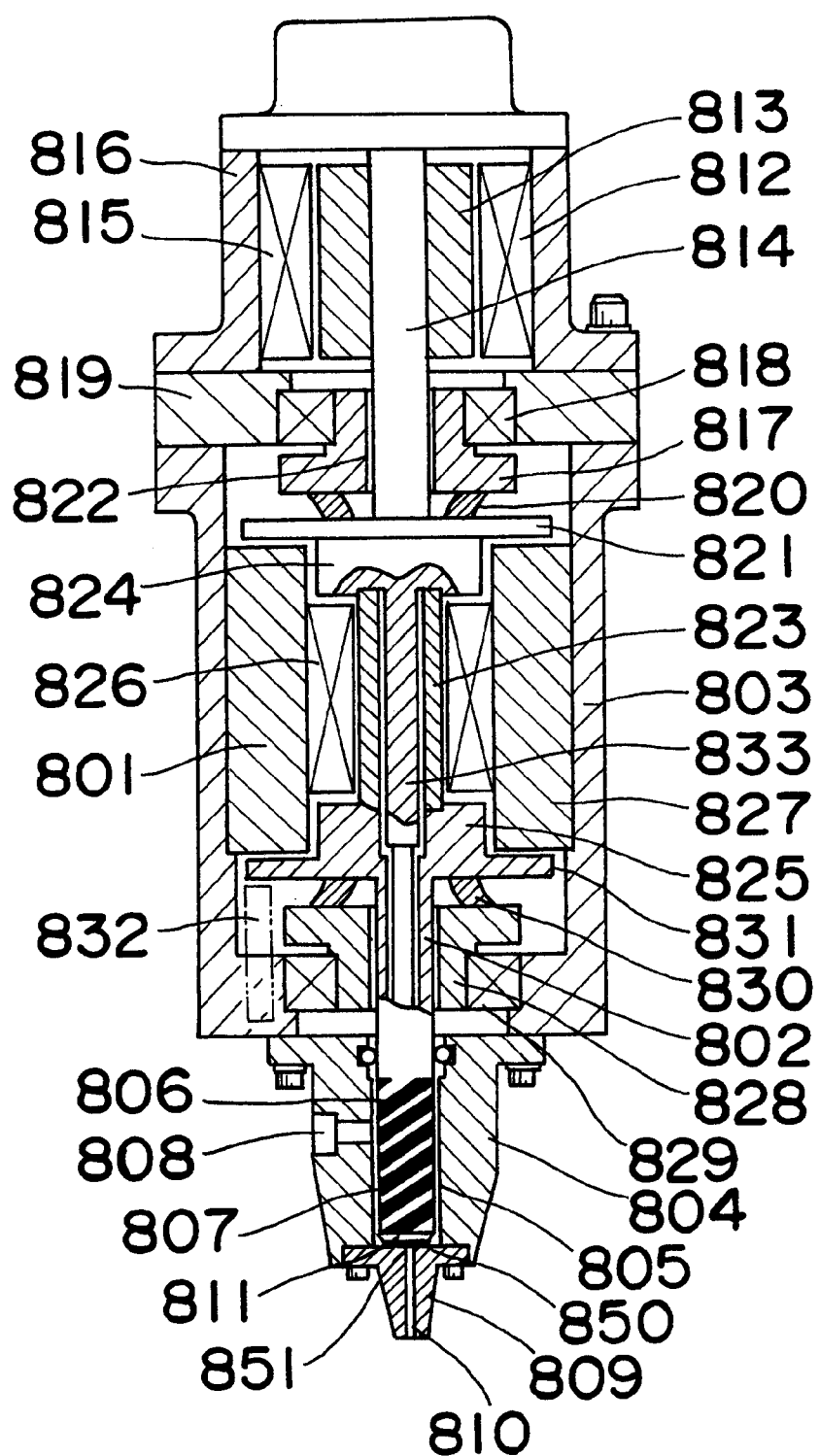
FIG. 10 is a front sectional view showing a dispenser according to the third embodiment.

A concrete third embodiment in which the present invention is applied to a dispenser for surface mounting of electrical components is described below with reference to FIG. 10.

Reference numeral 801 denotes a first actuator, for which a Giant-magnetostrictive element is used as in the first and second embodiments. Numeral 802 denotes an outer peripheral shaft driven by the first actuator 801. The first actuator 801 is housed in a housing 803, and a cylinder 804 for housing the outer peripheral shaft 802 therein is fitted to a lower end portion of the housing 803. Numeral 805 denotes a radial groove formed on the outer surface of the outer peripheral shaft 802 and serving for pressure feed of the fluid to the discharge side, and 806 denotes a radial groove for use of sealing.

Between the outer peripheral shaft 802 and the cylinder 804, is formed a pump chamber 807 for fulfilling a pumping action by relative rotation of the outer peripheral shaft 802 and the cylinder 804. Also, in the cylinder 804 is formed an inlet hole 808 communicating with the pump chamber 807. Numeral 809 denotes a discharge nozzle fitted to the lower end portion of the cylinder 804, where a discharge hole 810 is formed at a central portion. Numeral 811 denotes a discharge-side thrust end face of the outer peripheral shaft 802, where a discharge-nozzle opening 851 is formed in a face 850 opposite to the thrust end face 811.

Reference numeral 812 denotes a second actuator, which gives relative rotary motion between the main shaft 802 and the cylinder 804.

A motor rotor 813 is fixed to an upper main shaft 814, and a motor stator 815 is housed in a housing 816.

Reference numeral 817 denotes an upper sleeve press-fitted to the inner-ring side of a ball bearing 818, and the outer-ring side of this ball bearing 818 is housed in a housing 819. Numeral 820 denotes an upper bias spring fitted between a thrust disc 821 and the upper sleeve 817.

This upper main shaft 814 is supported on a slide bearing 822 formed between the upper main shaft 814 and the upper sleeve 817.

Reference numeral 823 denotes a Giant-magnetostrictive rod formed of a hollow Giant-magnetostrictive element, and this Giant-magnetostrictive rod 823 is sandwiched from above and below by a yoke member A 824 and a yoke member B 825. Numeral 826 denotes a magnetic field coil for giving a magnetic field lengthwise of the Giant-magnetostrictive rod 823. Numeral 827 denotes a permanent magnet for giving a bias magnetic field, being housed in the housing 803.

Reference numeral 828 denotes a lower sleeve press-fitted to the inner-ring side of a ball bearing 829, and the outer-ring side of this ball bearing 829 is housed in the housing 803. Numeral 830 denotes a lower bias spring fitted between a lower thrust disc 831 and the lower sleeve 828.

Reference numeral 832 denotes a displacement sensor mounted on the housing 803, and the axial absolute position of the outer peripheral shaft 802 is detected by this displacement sensor 832 and the lower thrust disc 831.

Reference numeral 833 denotes a central shaft which is provided so as to extend through the hollow Giant-magnetostrictive element, and which is tightened at its upper end portion to the yoke member A 824. A lower end portion of the central shaft 833 is disposed, extending through the inside of the outer peripheral shaft 802, so as to face the discharge-nozzle opening 851 as shown in model diagrams of FIGS. 8 and 9.

In this constitution, bias loads at both ends is normally given to the Giant-magnetostrictive rod 823 by the upper bias spring 820 at the upper part thereof and by the lower bias spring 830 at the lower part thereof. Therefore, when a magnetic field is applied to the Giant-magnetostrictive rod 823, the Giant-magnetostrictive rod 823 is expanded at its both ends. The gap between thrust end faces becomes smaller on the discharge-nozzle side of the outer peripheral shaft 802, while the gap between the faces on, the discharge-nozzle side of the central shaft 833 becomes larger. As a result, the total capacity V between the thrust end faces can be made, for example, normally constant.

Besides, displacement quantities of the outer peripheral shaft 802 and the central shaft 833 can be set to arbitrary values by the settings of spring constants of the two bias springs 820, 830.

When it is preferred that the total capacity V between the thrust end faces is rather decreased, spring rigidity of the upper bias spring 820 is set larger as compared with the lower bias spring 830 so that axial displacement of the central shaft 833 becomes smaller.

Conversely, when it is preferred that the total capacity V is increased, the spring rigidity of the upper bias spring 820 may well be set weaker so that the displacement of the central shaft 833 becomes larger.

(Description of Other Embodiments)

Modification proposals of the above-described three embodiments as well as other embodiments are described below.

Figure 11A:
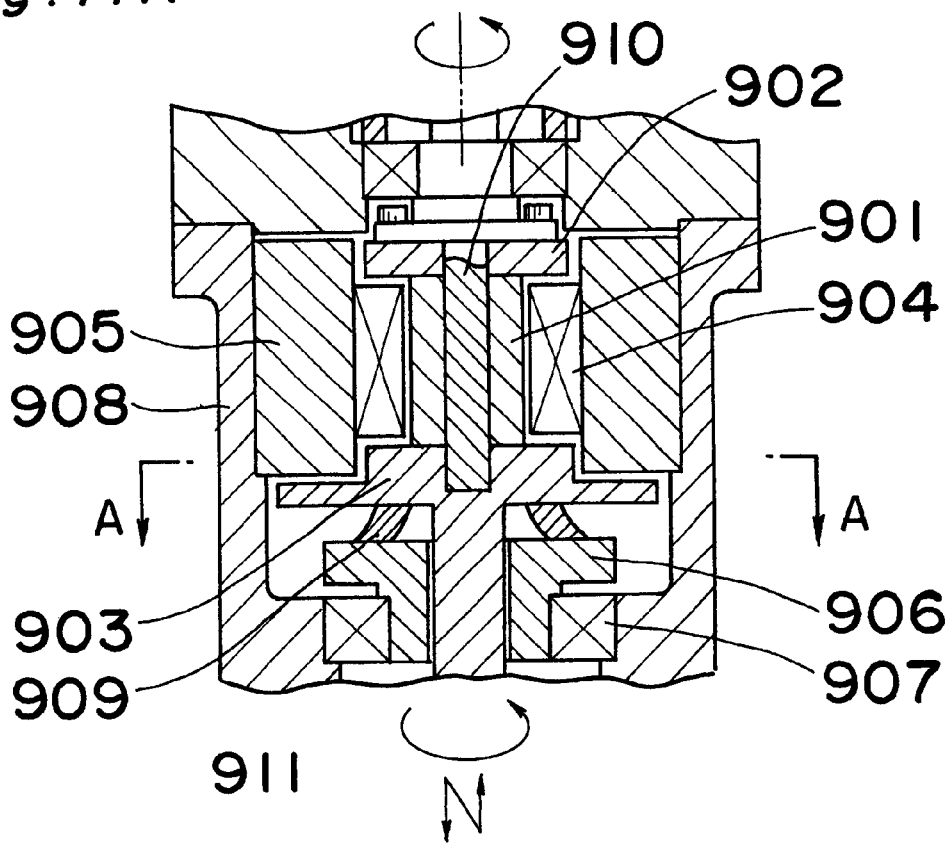
FIGS. 11A and 11B are diagrams showing a contrivance for not giving a torsional stress to the Giant-magnetostrictive element, where
Figure 11B:

FIGS. 11A and 11B show a method for effectively transferring rotating torque of the motor to the main shaft of the pump part via a Giant-magnetostrictive element as a fourth embodiment of the present invention. In the first to third embodiments, any of the main shafts with radial grooves formed thereon performs both rotary and rectilinear motions. In this case, it is preferable that the rotating torque to be transferred from the motor to the main shaft is least applied to the Giant-magnetostrictive element, which is a brittle material. This applies also to cases where a piezo-electric element, which is a brittle material as well, is used instead of the Giant-magnetostrictive element.

Reference numeral 901 denotes a Giant-magnetostrictive rod formed of a hollow Giant-magnetostrictive element, and this Giant-magnetostrictive rod 901 is sandwiched from above and below by a yoke member A 902 and a yoke member B 903. Numeral 904 denotes a magnetic field coil for giving a magnetic field lengthwise of the Giant-magnetostrictive rod 901. Numeral 905 denotes a permanent magnet for giving a bias magnetic field.

Reference numeral 906 denotes a lower sleeve press-fitted to the inner-ring side of a ball bearing 907, and the outer-ring side of this ball bearing 907 is housed in a housing 908. Numeral 909 denotes a bias spring fitted between the yoke member B 903 and the sleeve 906.

Reference numeral 910 denotes a rotation transfer shaft provided so as to extend through a central portion of the Giant-magnetostrictive rod 901. An upper end portion of the rotation transfer shaft 910 is fixed to the yoke member A 902, and a lower end portion thereof is so shaped as to be rotation-transferable (FIG. 11B) to the yoke member B 903 while being relatively movable axially.

With this construction, the rotating torque transferred from the motor (not shown) located above to the yoke member A 902 can be transferred to a main shaft 911 of a pump chamber without giving any torsional stress to the Giant-magnetostrictive rod 901.

Thus, a description has been given on the method employing the hollow Giant-magnetostrictive rod, through which the rotation transfer shaft is inserted to prevent torsional torque from transferring to the Giant-magnetostrictive rod. Otherwise, with a solid Giant-magnetostrictive rod accommodated in a cylindrical-shaped sleeve, rotating torque may be transferred with this rotation transfer sleeve. In this case, the rotation transfer sleeve may appropriately so formed as to be axially movable relative to the yoke member B 903 but capable of transferring rotation (FIG. 11B) (not shown).

Figure 12A:
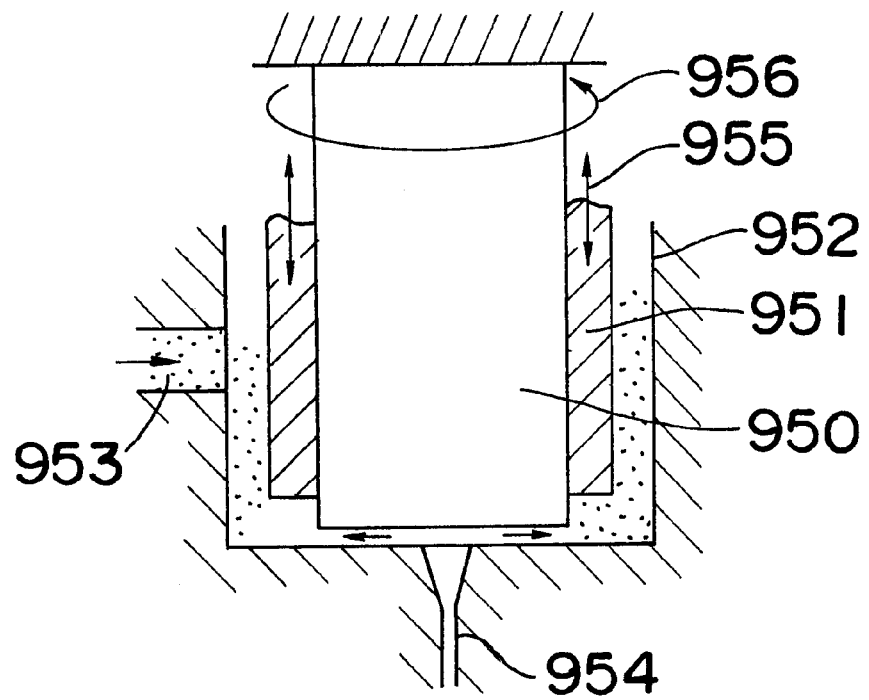
FIGS. 12A and 12B are model diagrams showing a case where a thread groove is used for pumping action, where
Figure 12B:
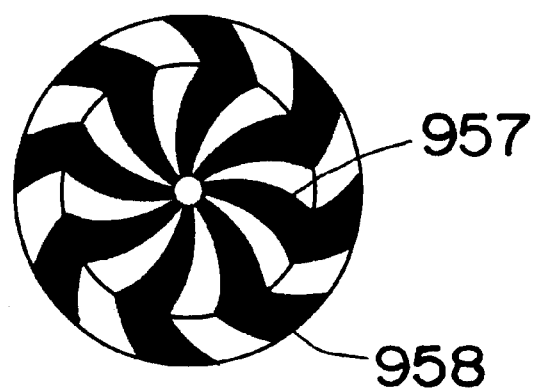

FIGS. 12A and 12B show a method for performing ON/OFF control of discharge state by using a thrust type groove as a device for conveying fluid and by moving up and down this thrust type groove as a fifth embodiment of the present invention.

Reference numeral 950 denotes a central shaft, 951 denotes an outer peripheral shaft, 952 denotes a housing, 953 denotes an inlet port, and 954 denotes a discharge nozzle. Numeral 955 denotes an axial drive device, 956 denotes a rotating device for the central shaft 950 and the outer peripheral shaft 951, 957 denotes a sealing groove formed on the relative movement surface of the discharge-side end portion of the central shaft 950, and 958 denotes a pumping groove formed on the relative movement surface of the discharge-side end portion of the outer peripheral shaft 951.

With the outer peripheral shaft 951 moved down, if the gap to its opposing face is narrow enough, the pumping groove 958 acts effectively to pressure-feed the fluid to the discharge nozzle 954 side against the pumping pressure of the sealing groove 957.

With the outer peripheral shaft 951 moved up, the pumping pressure of the pumping groove 958 decreases, so that the outflow of the fluid is shut off by the sealing groove 957.

With the constitution of this fifth embodiment, the discharge flow rate can be adjusted not only by the rotational speed of the motor but also by the size of the gap between the end face of the outer peripheral shaft 951 and its opposing face.

The outer surface of the outer peripheral shaft 951 may be a perfect circle without any groove, or otherwise a radial groove serving as an aid to the pumping action of the pumping groove 958 may be formed on the outer peripheral shaft 951 (not shown).

Figure 13:
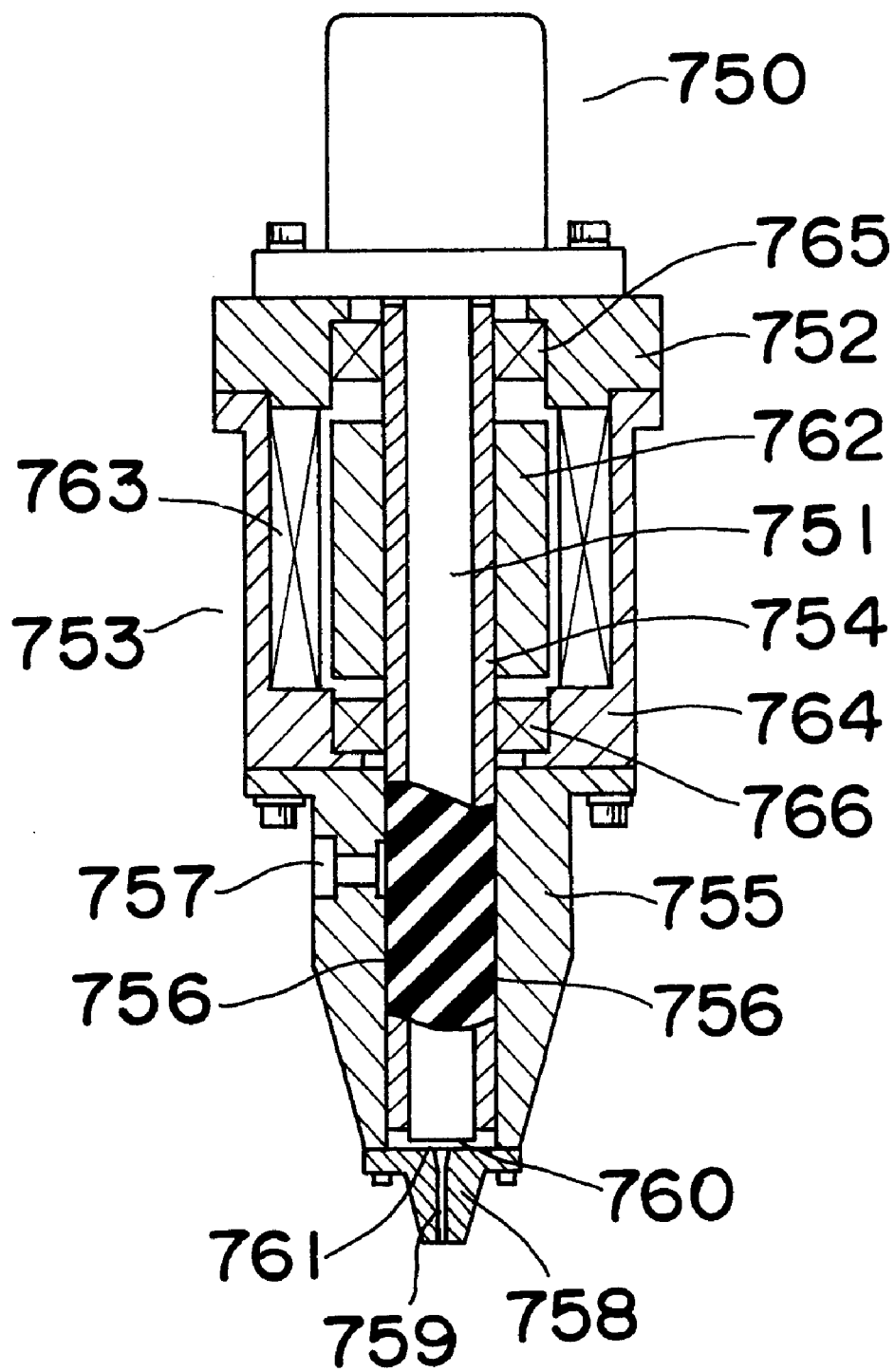
FIG. 13 is a front sectional view showing a dispenser in which an axial moving device is provided on the central shaft.

FIG. 13 shows a constitution in which the central shaft extending through the hollow outer peripheral shaft is provided with an axial drive device as a sixth embodiment of the present invention.

Reference numeral 750 denotes a first actuator, for which a Giant-magnetostrictive element or a piezoelectric element is used. Numeral 751 denotes a central shaft driven by the first actuator 750. The first actuator 750 is placed above a housing 752. Numeral 753 denotes a second actuator, which gives relative rotary motion between an outer peripheral shaft 754 and a cylinder 755.

Reference numeral 756 denotes a radial groove formed on the outer surface of the outer peripheral shaft 754 and serving for pressure feed of the fluid to the discharge side. Between the outer peripheral shaft 754 and the cylinder 755, is formed a pump chamber 756 for fulfilling a pumping action by relative rotation of the outer peripheral shaft 754 and the cylinder 755. Also, in the cylinder 755 is formed an inlet hole 757 communicating with the pump chamber 756. Numeral 758 denotes a discharge nozzle fitted to the lower end portion of the cylinder 755, where a discharge hole 759 is formed at a central portion thereof. Numeral 760 denotes a discharge-side thrust end face of the central shaft 751, where a discharge-nozzle opening is formed in a face 761 opposite to the thrust end face 760.

A motor rotor 762 is fixed to the outer peripheral shaft 754, and a motor stator 763 is housed in a housing 764. Numerals 765, 766 denote ball bearings for supporting the outer peripheral shaft 754.

When a Giant-magnetostrictive element is used for the first actuator 1, a Giant-magnetostrictive rod may appropriately be mounted on the central shaft 751, as in the first to third embodiments, so as to be movable in the axial and rotational directions (not shown).

In this case also, forming a spiral groove dynamic thrust seal in the relative movement surface of the thrust end face makes it possible to fulfill ON/OFF control of the discharge flow rate by the movement of the central shaft.

Figure 14:
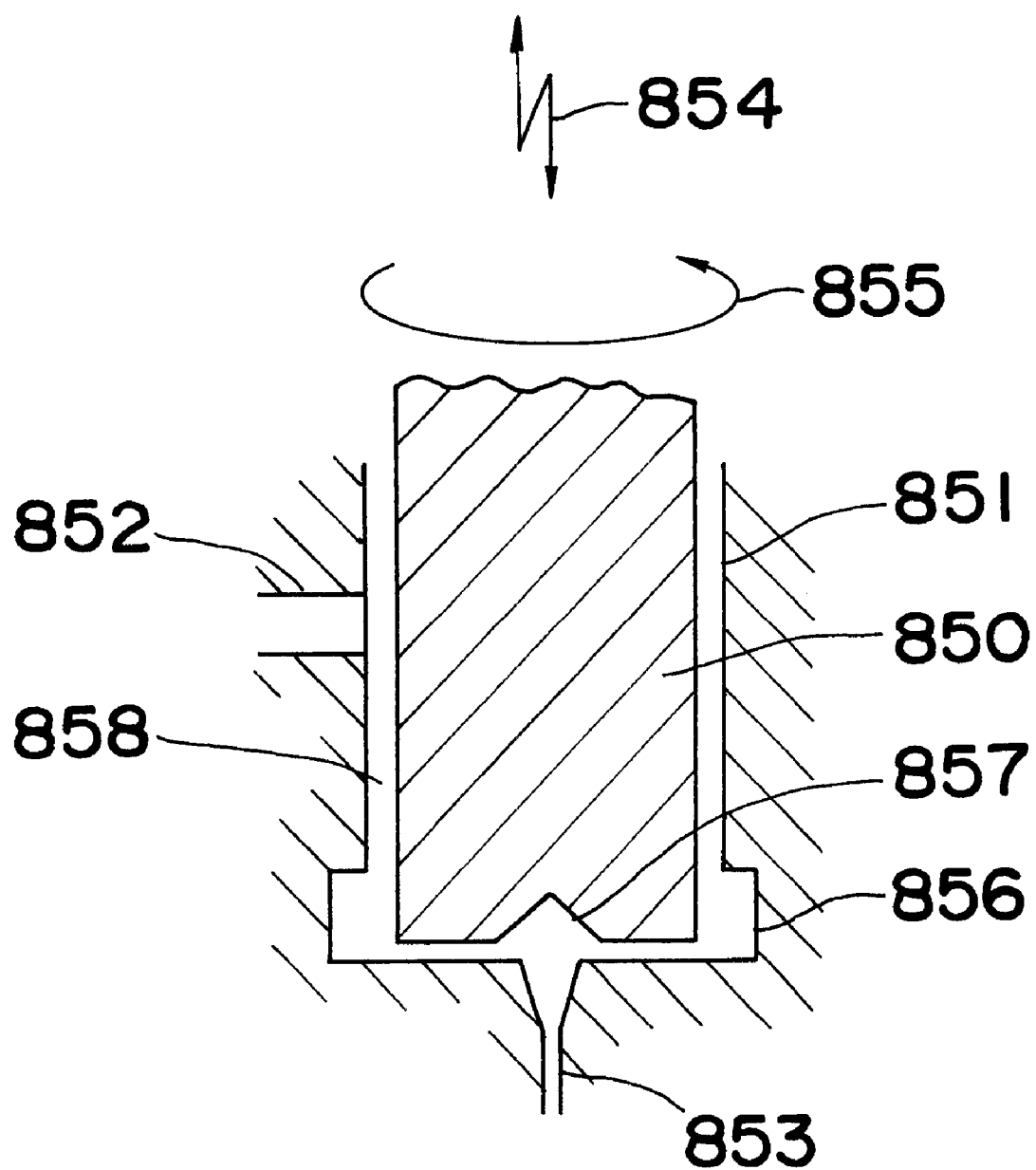
FIG. 14 is a model diagram showing a contrivance for relaxing pressure increase at the shaft end portion.

FIG. 14 shows a method for relaxing pressure increase due to a rapid approach between the thrust-side end face of the shaft and its opposing face as a seventh embodiment of the present invention. This method can be applied effectively to all the embodiments of the present invention.

Reference numeral 850 denotes a shaft, 851 denotes a cylinder, 852 denotes an inlet port, and 853 denotes a discharge nozzle. The shaft 850 is driven by axial drive device 854 and a rotating device 855 as in the foregoing embodiment. Numeral 856 denotes a stationary-side void portion formed on the cylinder side within a pump chamber 858, and 857 denotes a movement-side void portion. Both void portions 856, 857 have effects as accumulators for relaxing the pressure increase of fluid, being particularly effective for application of high-compression fluid.

The above embodiments of the present invention have been described primarily on a method in which the gap between the discharge-side end face of the shaft and its opposing face is changed to perform the control of the discharge flow rate. In the present invention, however, the discharge flow rate is controllable only if the gap between shaft and the housing is changeable.

Figure 15A:
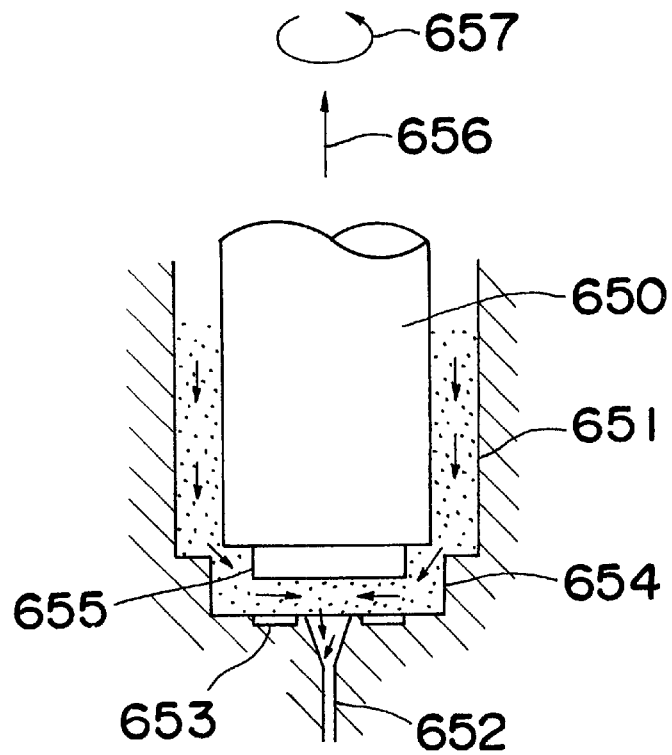
FIGS. 15A and 15B are diagrams showing a case in which the seal portion is provided on the axial flow passage, where
Figure 15B:
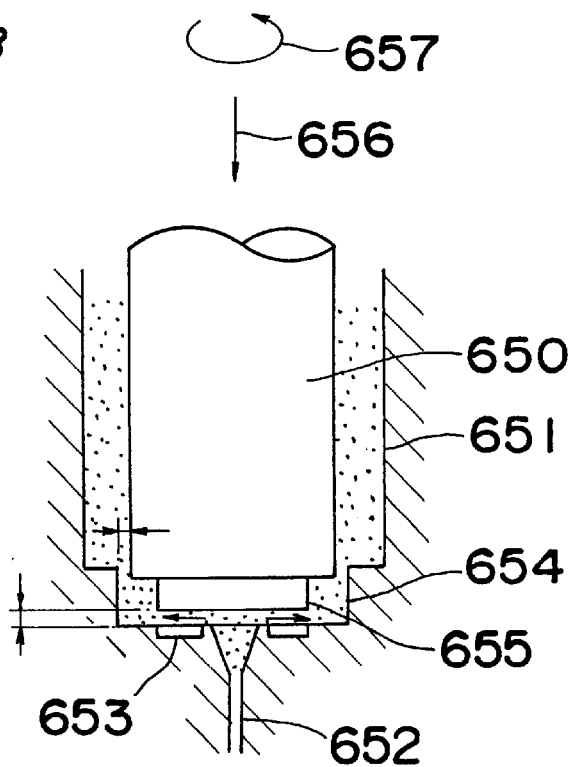

FIGS. 15A and 15B show a method for changing not the thrust end face but the opening area of the axial fluid flow passage by an axial drive device as an eighth embodiment of the present invention.

Reference numeral 650 denotes a shaft, 651 denotes a cylinder, 652 denotes a discharge nozzle, 653 denotes a thrust dynamic seal, 654 denotes a seal portion formed on the inner surface of the cylinder 652, 655 denotes a small-diameter portion formed on the shaft side, 656 denotes an axial drive device, and 657 denotes a rotating device.

In FIG. 15A, the opening area of the seal portion 654 is large enough that the discharge flow rate is in the ON state. In FIG. 15B, because of a throttled opening area, the discharge flow rate is in the OFF state.

The thrust dynamic seal 653 provided as an aid has a centrifugal pumping action (arrow in the figure), and therefore has an effective of preventing dropping and thread-forming of the fluid as in the foregoing embodiments. Also, since a sufficient sealing effect has already been obtained by the seal portion 654, the sealing power of the dynamic seal 653 needs only to be quite small. This means that a minimum gap $\delta 2$ min between thrust end faces may be sufficiently large.

In the case where an adhesive mixed with powder having a large particle size (e.g., powder outer diameter $\phi d = 20–30$ $\mu$m) or the like is handled, squeezing fracture event of powder at the seal portion can be avoided by setting the seal portion 654 so as to satisfy that $\delta 1$ min<$\phi d$. Also, the minimum gap between the thrust end faces may appropriately be set so that $\delta 2$ min>>$\phi d$.

Depending on the purpose of use, the dynamic seal may be omitted.

Although the foregoing embodiment has used a thread groove pump as the device for pressure-feeding the fluid in the pump chamber, it is also possible to use pumps other than the thread groove type, e.g. known positive displacement type, centrifugal type, or other type pumps may also be applied.

Further, a pump for pressure-feeding the fluid may also be provided outside the device. Otherwise, as is done with normal dispensers, the fluid may be injected and pressure-fed into the dispenser with high-pressure air. In this case, the thread groove pump may be omitted and the air pressure serves as the device for pressure-feeding the fluid toward the discharge side.

Figure 16A:
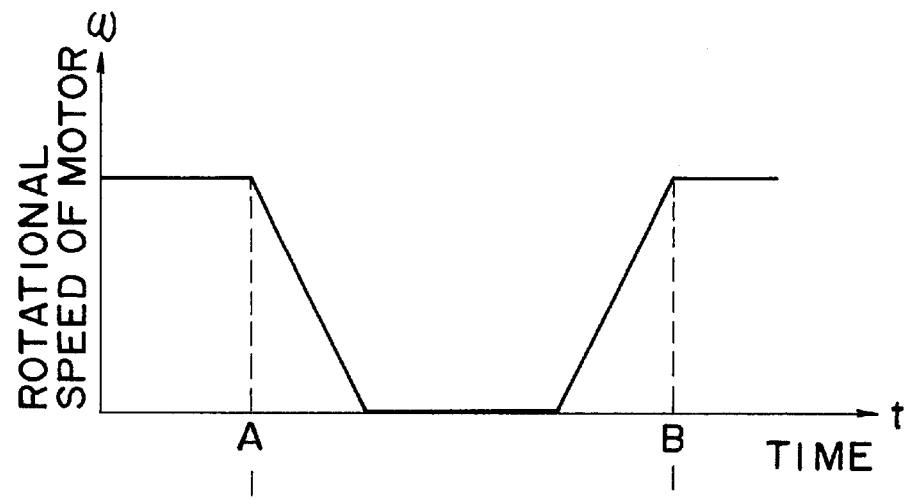
FIGS. 16A and 16B are charts showing a case in which control by a motor and control by an axial moving device are combined together, where
Figure 16B:
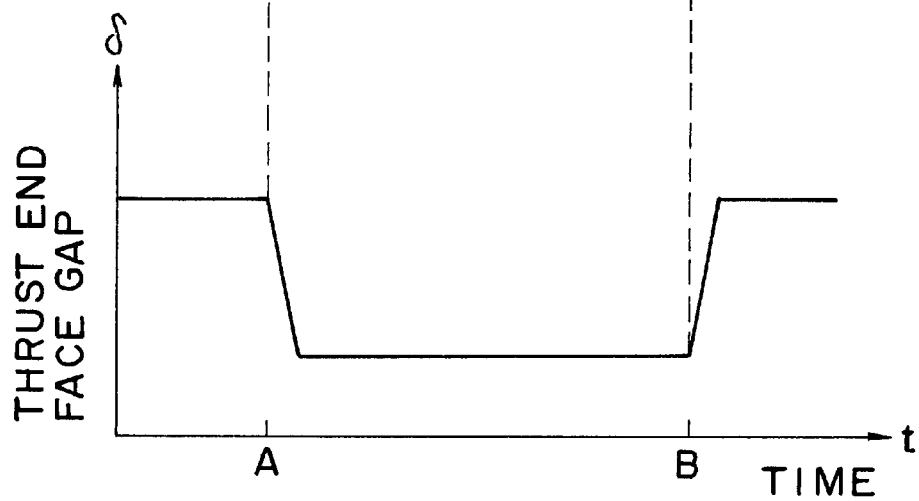
Figure 17:
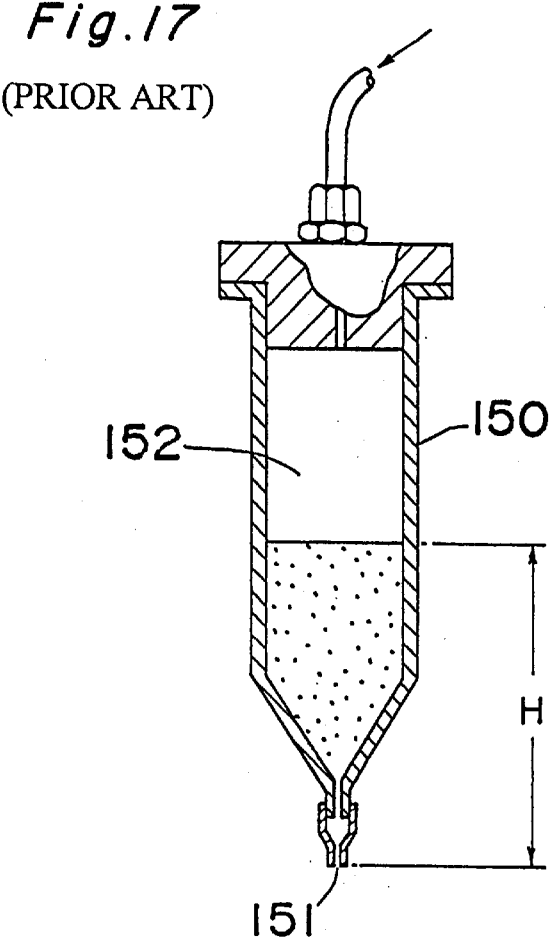
FIG. 17 is a front sectional view of a conventional dispenser.
Figure 18:
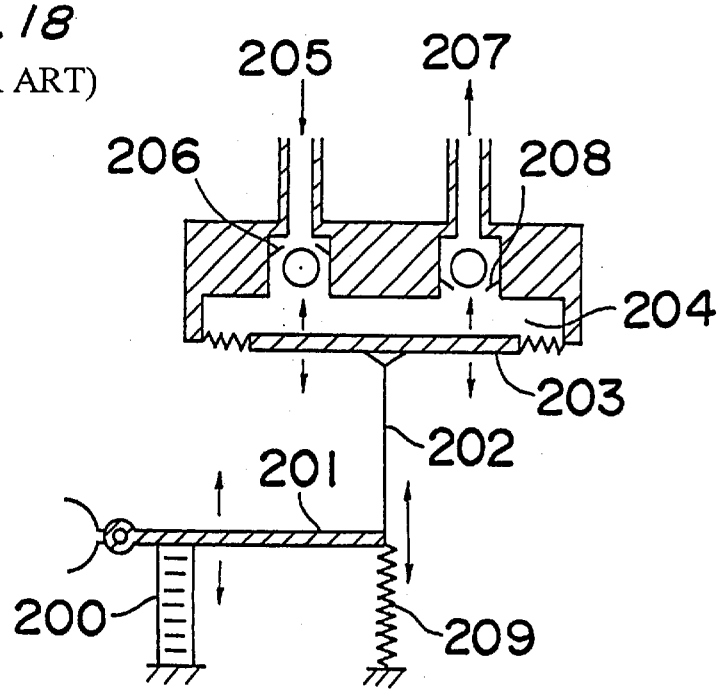
FIG. 18 is a principle diagram of a conventional piezo-type dispenser.
Figure 19:
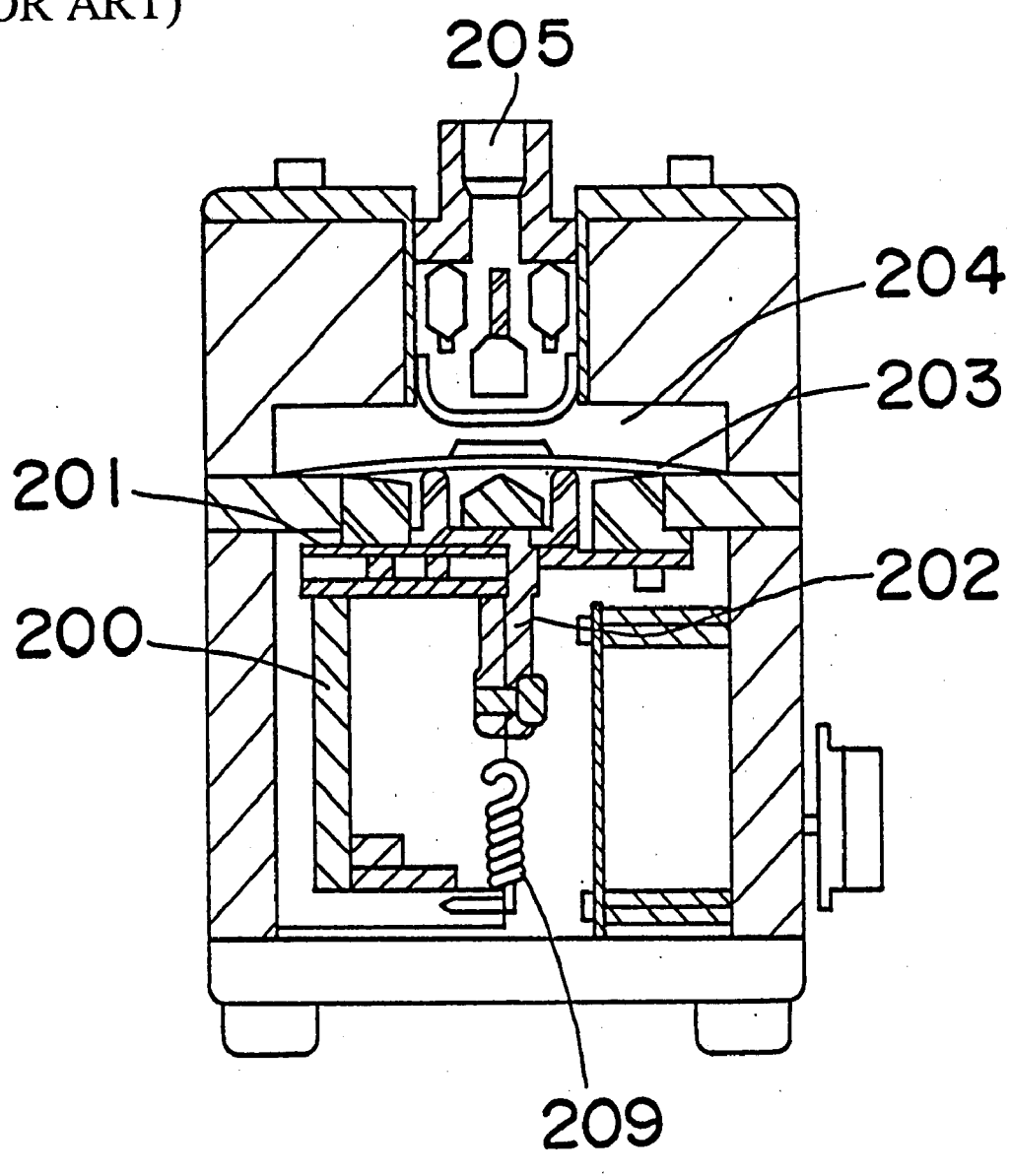
FIG. 19 is a front sectional view of a conventional piezoelectric-type dispenser.
Figure 20:
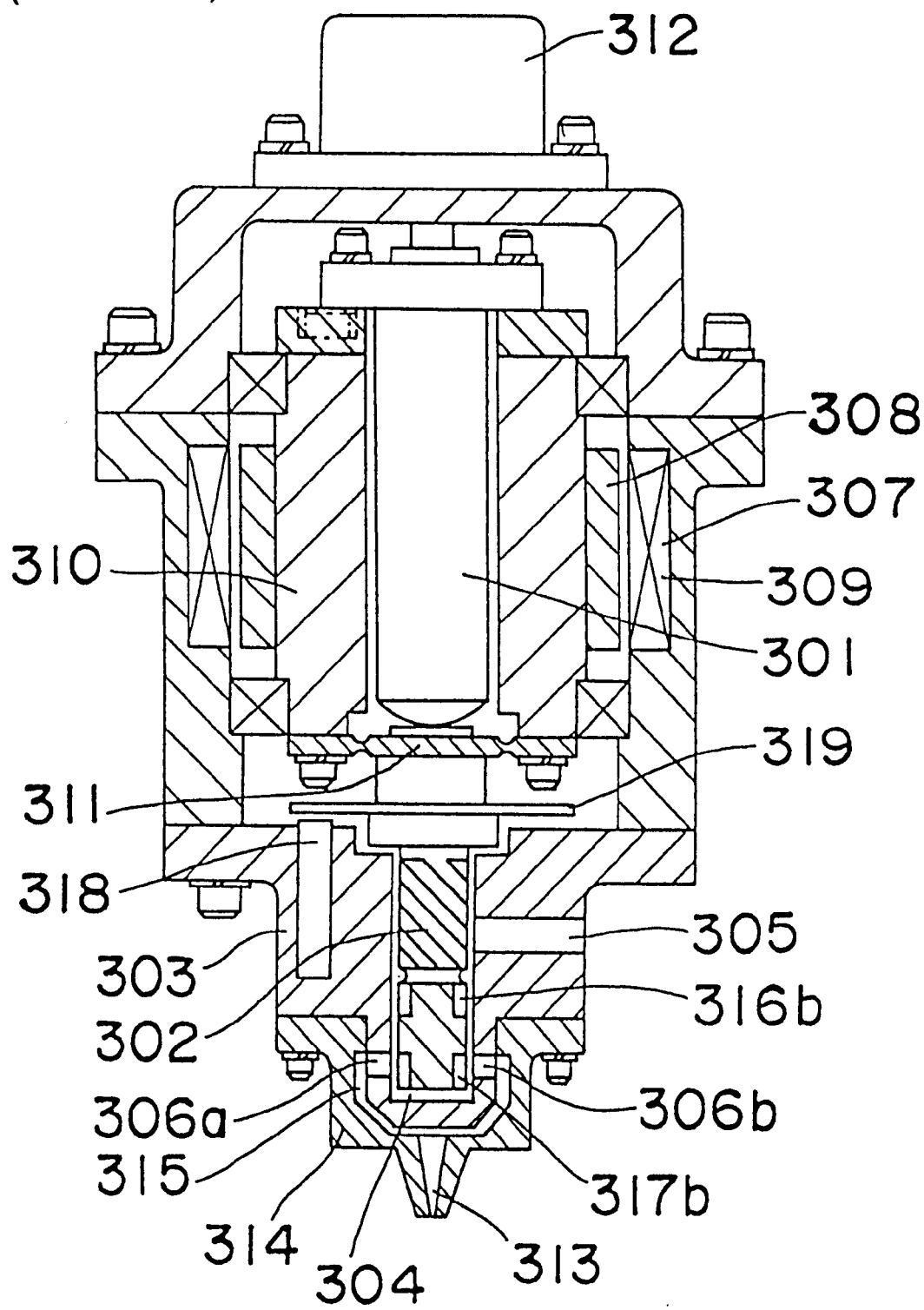
FIG. 20 is a front sectional view of a dispenser which is a prior art proposal and which utilizes a laminate type piezoelectric element and motor rotation.

FIG. 16 shows a method in which the method of the embodiment of the present invention using the axial movement of the rotary shaft is combined with rotational speed control of a DC motor to perform the ON/OFF control of discharge flow rate, as a ninth embodiment of the present invention.

For example, some kinds of adhesive or the like, when left under high pressure for a long time, may be subject to characteristic changes. In this case, it is advantageous to halt the rotation of the motor during strokes a process involving no coating. However, as described at the beginning of this Specification, in the case where the ON/OFF control of discharge flow rate is controlled by the rotational-speed (rotational number) control of the motor, there have been limitations on the flow rate accuracy in terms of the response at transient responses.

FIG. 15A shows the relationship between the rotational speed of the motor and the time, and FIG. 15B shows the relationship between the size of the thrust end face gap and the time.

For a turn-OFF of the discharge flow rate, speed reduction of the motor and the operation of narrowing the thrust end face gap by using the axial moving device are started simultaneously. With an electromagnetostrictive element used as the axial moving device, by virtue of its further higher response as compared with DC motors, the discharge flow rate is sharply shut off instantaneously. As a result, the shaft rotation is halted slowly by the speed reduction of the motor.

Conversely, for a turn-ON of the discharge flow rate, after the previously started motor has come into a steady-state rotation, an operation of increasing the thrust end face gap is started by using the axial moving device. Thus, the fluid discharge can promptly be started.

In the present invention, in the cases of the second and third embodiments employing the dynamic thrust bearing as the fluid seal, making use of ON to OFF intervals of the discharge flow rate makes it possible to fulfill a continuous control of the flow rate. In this case, the gap between the shaft end portion and its opposing face, and the flow rate are in a one-to-one relation, it is appropriate to position the shaft by using the output of the displacement sensor so that the aforementioned gap can be obtained. For this purpose, the relationship between the flow rate and the output value of the displacement sensor is preferably determined in advance.

Although changing the rotational speed of the motor also allows the flow rate control to be fulfilled, there are limitations on response as described before. Using an electromagnetostrictive element as the axial driving device enables the control of any arbitrary flow rate at an extremely quick response.

In the embodiments of the present invention, in all case, the method has been shown in which the gap between the shaft and the housing is changed by axial drive device to fulfill the control of the discharge flow rate.

The purpose of changing the gap between the shaft and the housing is changed is to increase or decrease the fluid resistance between the pump chamber and the discharge port. As the device for increasing or decreasing the fluid resistance, there is the method of (1) changing the passage resistance, as shown in the first embodiment. There is also the method of (2) forming the dynamic seal, as shown in the second embodiment. Otherwise, (3) the discharge flow rate can be reduced by using a negative pressure effect, which is attributable to the fact that a space is formed between the thrust-side shaft end and its opposing face by a movement of the shaft. These methods are herein included in the "action of increasing or decreasing the fluid resistance in the present invention."

In the above case of (3), for example, as explained by using FIGS. 3A and 3B, the sealing thrust groove 607 may not be formed between the shaft and the housing, and the gap δ may be sufficiently large. In this case, fluid is intermittently discharged by the squeeze action effect or compressing action which is occurred by rapid downward movement of the shaft. The shut off of the fluid utilizes a negative pressure effect caused by the upward movement of the shaft. As one example, the thread groove 602 may be utilized for a supply source of the fluid.

Although the second actuator (motor) is placed above the first actuator (Giant-magnetostrictive element), yet those actuators may be placed in the reverse arrangement in the embodiments. Otherwise, the first actuator may also be accommodated inside the second actuator.

In cases where high response and output load are unnecessary, a voice coil motor capable of obtaining a large stroke may also be used instead of the Giant-magnetostrictive element.

Otherwise, even a DC servomotor in which the motor rotor is a magnet exerts axial attractive force, and therefore, by using this function of the servomotor, the rotary shaft may be moved axially by adjusting the current flowing through the stator coil.

In the case where a piezoelectric element is used, the piezoelectric element may be placed on the rotational side and power may be supplied to the rotational side with a conductive brush.

In the embodiments, in order to drive the Giant-magnetostrictive element (first actuator), the permanent magnet 21 for giving a bias magnetic field is placed on the outer peripheral side of the magnetic field coil 20. When this permanent magnet is omitted and a bias magnetic field is given with a bias current flowing through the magnetic field coil, the body of the dispenser can be further reduced in its outer diameter (not shown).

As a result, it becomes possible to dispose a plurality of dispensers in parallel, where the present invention is applicable also to such processes as coating fluorescent material or the like onto a flat plate. In this case, whereas the intake-side feed passage of coating material may be provided in common, the discharge flow rate (and its ON and OFF) can be controlled independently among those dispensers, so that a flat-plate surface coating at a high degree of freedom becomes implementable.

Otherwise, when the contents of a plurality of dispensers are accommodated in a common housing, there can be provided a multi-nozzle equipped coating device simpler in construction (not shown).

(Tenth Embodiment)

In any of the foregoing embodiments except the sixth embodiment, the axial drive device for changing the relative gap between the stationary and rotational side has been provided on the rotational side.

Below shown is a tenth embodiment of the present invention in which this axial drive device is provided on the stationary side so that even higher accuracy of the discharge rate as well as simplification of the device can be achieved.

Figure 21:
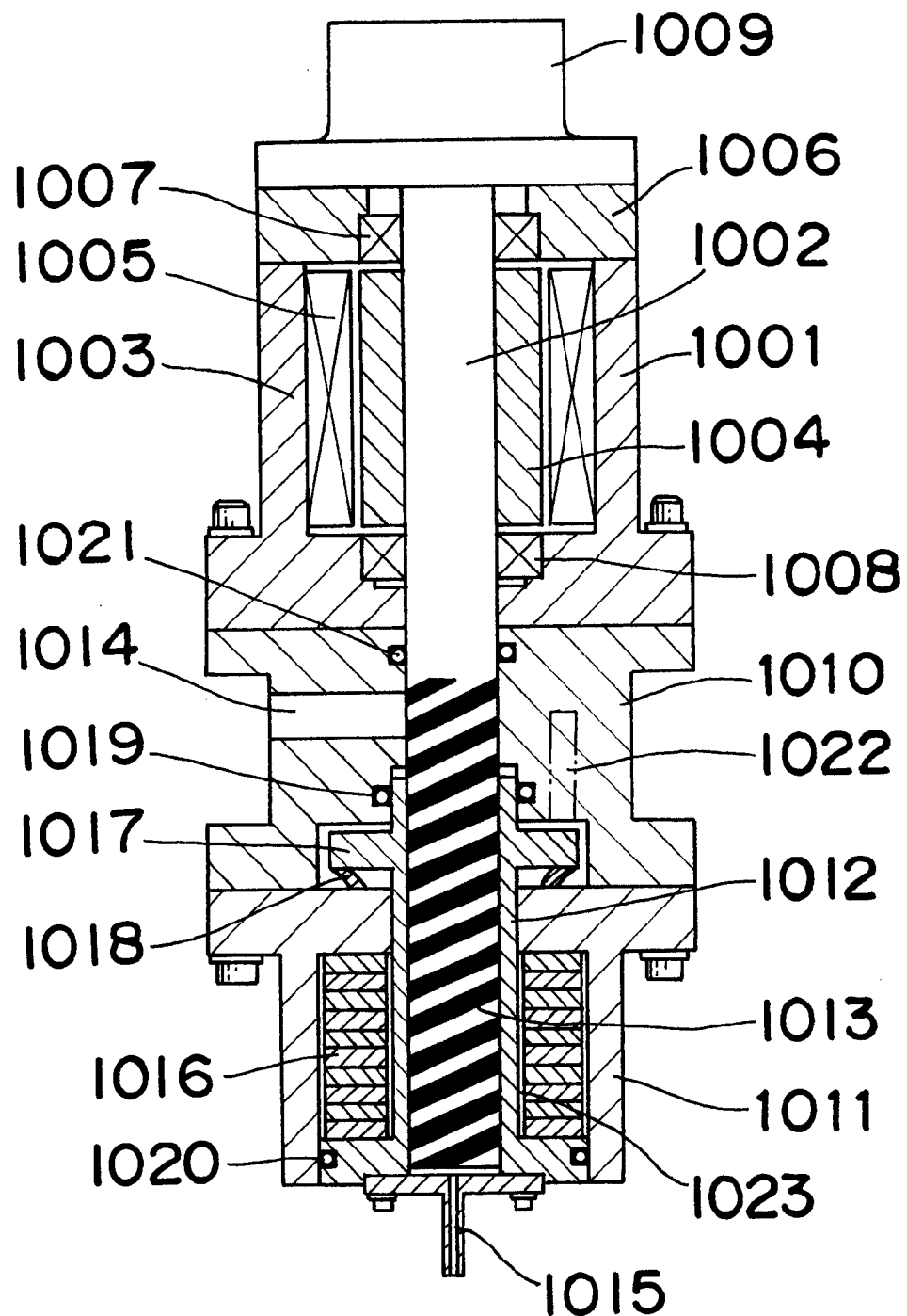
FIG. 21 is a front sectional view showing a dispenser according to a tenth embodiment of the present invention.

The tenth embodiment in which the present invention is applied to a dispenser for use of surface mounting of electronic components is described with reference to FIG. 21.

Reference numeral 1001 denotes a motor, which gives relative rotary motion between a rotary shaft 1002 and an upper housing 1003 in which the motor 1001 is housed. A motor rotor 1004 is fixed to the rotary shaft 1002, and a motor stator 1005 is housed in the upper housing 1003.

The rotary shaft 1002 is supported by a bearing A 1007 and a bearing B 1008 having the outer-ring side supported by an upper plate 1006 and the upper housing 1003, respectively. Numeral 1009 denotes an encoder that is placed in an upper end portion of the upper plate 1006 and detects rotation information on the rotary shaft 1002.

Numeral 1010 denotes an intermediate housing, 1011 denotes a lower housing, and 1012 denotes a movable sleeve for housing therein a lower end portion of the rotary shaft 1002.

Numeral 1013 denotes a radial groove 1013 formed on the outer surface of the rotary shaft 1002 and serving for pressure-feeding the fluid toward the discharge side, 1014 denotes an inlet port formed in the intermediate housing 1010, and 1015 denotes a discharge portion.

Numeral 1016 denotes a hollow-shaped laminate piezoelectric element, which is an axial drive device and fitted between the lower housing 1011 and the movable sleeve 1012. Numeral 1017 denotes a collar of the movable sleeve 1012, and 1018 denotes a disc spring fitted between the collar 1017 and the lower housing 1011. By this disc spring 1017, a pre-load is given axially to the laminate piezoelectric element 1016.

Numeral 1019 denotes a fluid seal provided between the movable sleeve 1012 and the intermediate housing 1010, 1020 denotes a fluid seal provided between the movable sleeve 1012 and the lower housing 1011, and 1021 denotes a fluid seal provided between the intermediate housing 1010 and the rotary shaft 1002.

The upper-end stationary side of the laminate piezoelectric element 1016 is fixed to the lower housing 1011, and its lower-end movable side is fixed to the movable sleeve 1012. When the piezoelectric element 1016 is expanded and contracted with an applied voltage, the movable sleeve 1012 expands and contracts axially to an extent of the expansion and contraction of the piezoelectric element 1016. Numeral 1022 denotes a displacement sensor for detecting an axial movement quantity of the movable sleeve 1012 provided in the intermediate housing 1010.

Between the rotary shaft 1002 and the movable sleeve 1012, is formed a pump chamber 1023 for fulfilling a pumping action by relative rotation of the members 1002 and 1004.

With this constitution, in the fluid discharge device of this embodiment, both the relative rotary motion and the relative rectilinear motion of minute displacement can be controlled between the rotary shaft 1002 and the movable sleeve 1012, concurrently and independently.

Further in this embodiment, the laminate piezoelectric element 1016 is used as the axial drive device and one end of the piezoelectric element 1016 is placed on the housing side, which is the stationary side. Thus, high positioning accuracy can be obtained.

Since an input voltage applied to the piezoelectric element 1016 and a displacement are proportional to each other, axial positioning control of the movable sleeve 1012 can be fulfilled even by open loop control without any displacement sensor. However, if a position detecting device 1022 as in the present embodiment is provided for the execution of feedback control, hysteresis characteristic of the laminate piezoelectric element 1016 can be improved so that higher-accuracy positioning can be executed.

In this embodiment, by using the axial positioning function of the movable sleeve 1012, the magnitude of the gap between the discharge-side end face of the rotary shaft 1002 and its opposing face, i.e., the gap between discharge-side thrust end faces, can arbitrarily be controlled while the rotary shaft is kept in the steady rotating state. By using this function, the powder and granular material can be shut off or opened in a mechanically non-contact state at any section of the flow passage from the inlet port 1014 to the discharge nozzle. The principle of this is explained with reference to FIG. 22, which is a detailed view of the discharge portion 1015.

Figure 22:
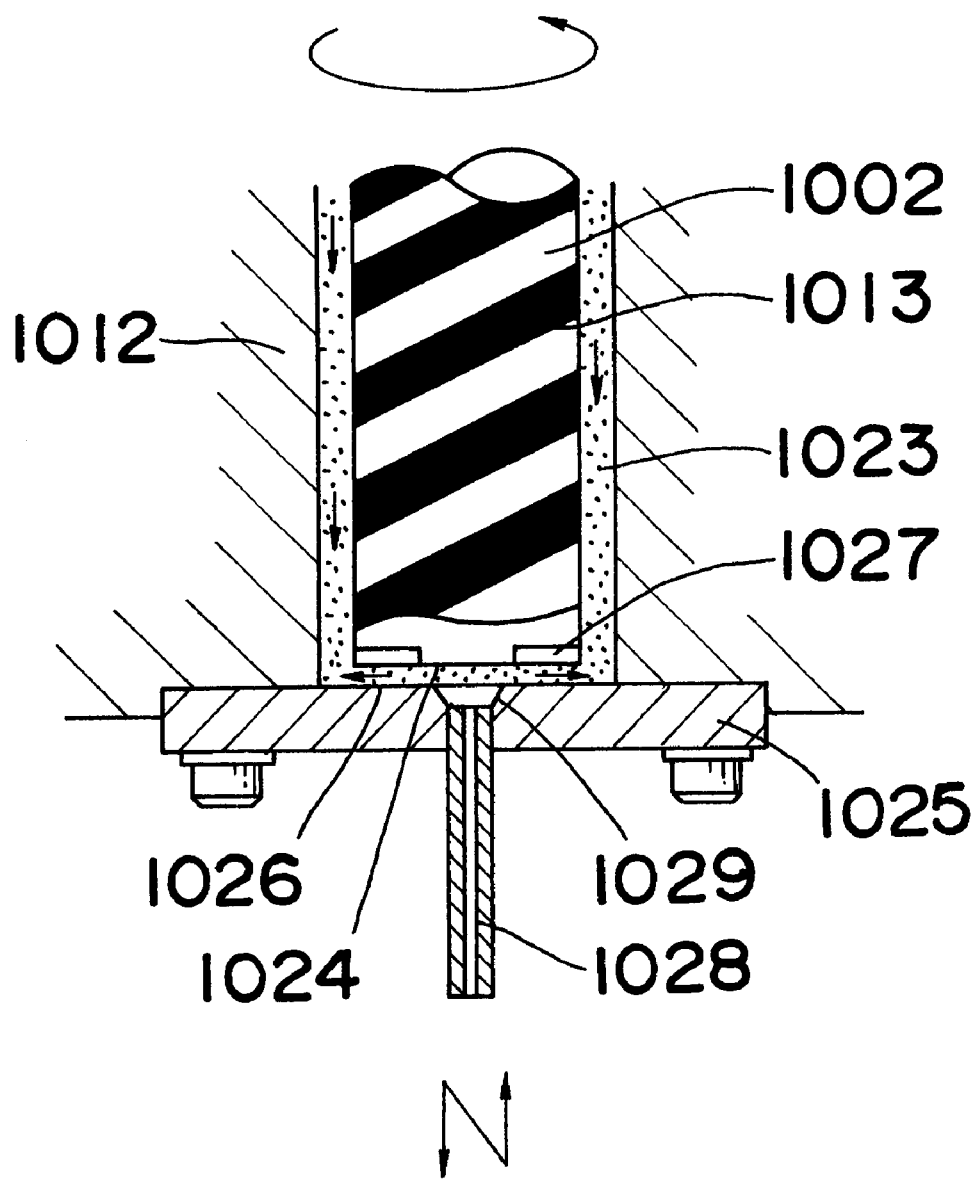
FIG. 22 is an enlarged view of a discharge portion of the dispenser of the tenth embodiment.

Referring to FIG. 22, reference numeral 1024 denotes a discharge-side end face of the rotary shaft 1002, and 1025 denotes a discharge plate tightened to the discharge-side end face of the movable sleeve 1012. A sealing thrust groove 1027 is formed in the relative movement surface of the discharge-side end face 1024 and its opposing face 1026 (on the movable sleeve 1012 side). An opening 1029 of a discharge nozzle 1028 is formed at a central portion of the opposing face 1026.

Figure 23:
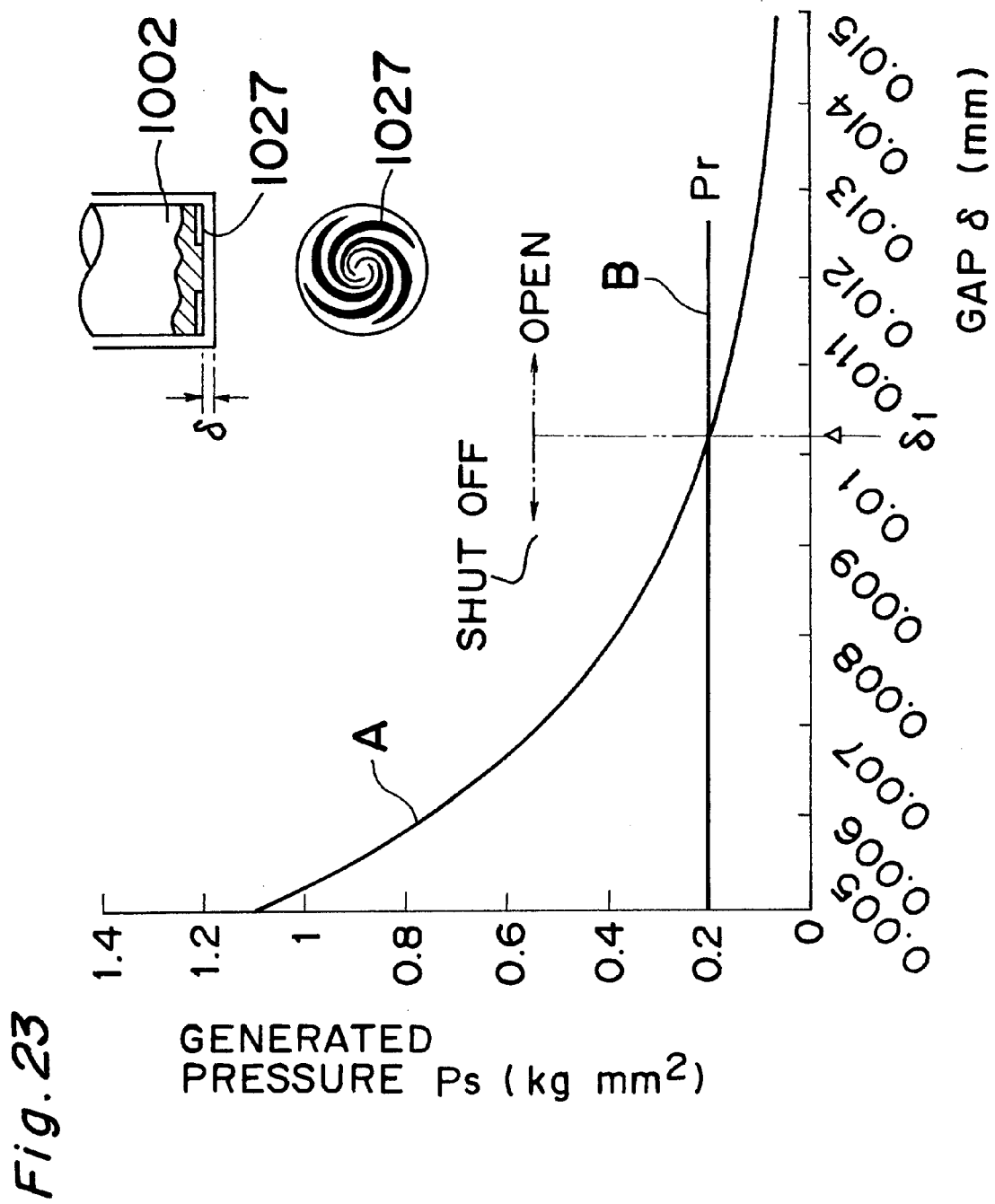
FIG. 23 is a graph showing the principle of the present invention.

A curve (A) in the graph of FIG. 23 represents characteristics of the sealing pressure Ps versus gap δ when a spiral-groove type thrust groove is used under the conditions of Table 2 shown below. A curve (B) in the graph of FIG. 23 is an example showing the relationship between the pumping pressure of the radial groove and the gap δ of the shaft tip with no axial flow. This pumping pressure of the radial groove may be selected at a wide range depending on the selection of radial gap, groove depth, and groove angle as in the thrust groove. Qualitatively, however, the pumping pressure Pr of the radial groove does not depend on the magnitude of the void at the shaft tip (i.e., magnitude of the gap δ).

With a sufficiently large gap δ of the sealing thrust groove, for example, with a gap δ=15 μm, generated pressure is so small as P<0.1 kg/mm².

While the shaft is kept rotating, an end face of the rotary shaft is made closer to the stationary-side opposite surface. As the gap becomes δ<10.0 μm, the sealing pressure increases over the pumping pressure Pr of the radial groove, causing the outflow of the fluid toward the discharge-port side to be shut off.

FIG. 22 shows a state that the outflow of the fluid is shut off, where the fluid in the vicinity of the opening 1029 of the discharge nozzle, receiving a centrifugal pumping action (indicated by arrow in FIG. 22) by the thrust groove 1027, has a negative pressure (below the atmospheric pressure) in the vicinity of the opening 1029. By this effect, the fluid remaining inside the discharge nozzle 1028 is sucked to the pump inside again after the shutoff. As a result, there occur no fluid bodies due to surface tension at the tip of the discharge nozzle, thus eliminating the occurrence of thread-forming and dropping.

In the embodiment of the present invention, the ON/OFF state of fluid discharge can freely be controlled by moving the rotary shaft axially only to an extent of about 5–10 μm.

Also, varying the gap δ during a continuous coating process makes it possible to continuously vary the flow rate. This variation of flow rate can be achieved quite promptly by using an electromagnetostrictive element as the axial drive device. This feature of the present embodiment produces an effect for such cases as in coating a liquid crystal panel with a seal material. In the case where the discharge nozzle runs on corner portions, it is generally difficult to make the line width uniform, because of varying running speed. With the use of this dispenser, since the flow rate can be set (programmed) so as to vary at necessary points subtly at high speed, making it possible to attain a uniform line width of coating at all the points.

Although the sleeve (movable sleeve) for housing therein the rotary shaft is cylindrical-shaped in this embodiment, the present invention is not limited to this cylindrical shape. The movable sleeve may be formed into any shape without being restricted to such a biased image as cylindrical sleeves, only if even one place that allows the gap against the rotary shaft to be changed can be provided on the movable sleeve.

Also, the thrust dynamic bearing may be either conical or spherical type other than the flat type as in the embodiment.

As compared with a flat type one, a spherical type thrust dynamic bearing allows a larger gap to be selected for the same sealing pressure, thus ready for larger particle size powder and granular material.

Spherical and conical type dynamic bearings, however, are obtuse in generated-pressure characteristic with respect to the axial gap, in which case the upper gap (on the pump chamber side) may appropriately be set larger than the gap in the vicinity of the bottom face (on the discharge nozzle side). For example, the radius of the stationary-side spherical surface (on the concave side) may be set larger than the radius of the rotary-shaft side spherical surface (on the convex side).

In the case of the conical and spherical types, the flow passage leading from the pump chamber 1007 to the discharge nozzle 1028 is smoother in shape, which is effective for prevention of powder deposition (not shown).

Further, such types as step bearings or tilting pat bearings other than the spiral groove type and the herringbone type capable of producing a dynamic pressure effect, or squeeze action bearings that provide a dynamic effect by giving high vibrations toward the bearing gap, or the like are also applicable (not shown).

Further in the above embodiment, a pair of discharge nozzle and pump section are provided, where the section other than the discharge nozzle is defined as a pump section. However, a plurality of discharge nozzles may be provided in one pump section depending on the application (not shown).

The aforementioned modes of embodiments are applicable also to the structures of the first to ninth embodiments.

TABLE 2

| Parameter | | Symbol | Set value |
| --- | --- | --- | --- |
| Rotational speed | | N | 200 rpm |
| Viscosity coefficient of fluid | | $\mu$ | 10000 cps |
| Sealing thrust groove | Groove depth | hg | 10 $\mu$m |
| | Radius | $R_o$ | 3.0 mm |
| | | $R_i$ | 1.5 mm |
| | Groove angle | $\alpha$ | 30 deg |
| | Groove width | bg | 1.5 mm |
| | Ridge width | br | 0.5 mm |

Although a laminate type piezoelectric element has been used as the axial drive device in the above embodiment, a Giant-magnetostrictive actuator which is an alloy of a rare earth element and iron may also be used. In this case, it is necessary to provide an electromagnetic coil and a bias permanent magnet, where the maximum stroke is two times larger than that of the laminate type. Also, for pumps that provide for minute flow rates, the stroke of gap $\delta$ for forming a "non-contact seal" has only to be on the order of several tens of microns at most, where the limit of the stroke of the electromagnetostrictive element such as Giant-magnetostrictive element or the piezoelectric element does not matter.

Also, in the case of discharging a high-viscosity fluid, occurrence of a large discharge pressure due to the pumping action by the radial groove is predicted. In this case, since the axial drive device is required to exert a large thrust force against a high fluid pressure, an electromagnetostrictive actuator capable of easily outputting a force of several hundreds to several thousands of newtons is preferred. The electromagnetostrictive element, by virtue of having a frequency response of not lower than several megahertz, allows the movable sleeve to exert rectilinear motion at high response characteristics. Therefore, the discharge rate of high-viscosity fluid can be controlled with high accuracy.

Taking advantage of using an electromagnetostrictive element as the axial drive device, if high-frequency vibrations are superimposed on the drive of the movable sleeve, axial vibrations can be given directly to the discharge nozzle 1028. As a result, fluid bodies which would generally be deposited to vicinities of the tip of the discharge nozzle due to surface tension are eliminated, thus allowing a very sharp coating to be attained. This is an effect obtained by the placement that the axial drive device (ex. electromagnetostrictive element) that gives axial relative displacement to the rotary shaft is provided between the housing and the movable sleeve (not shown).

As compared with the foregoing first to ninth embodiments (except the sixth embodiment), this embodiment has less restrictions on the rotational speed, allowing higher-speed operation, by virtue of the arrangement that the axial drive device is not provided at the rotating section. As a result, the thrust dynamic seal and the radial groove pump can be improved in performance.

Meanwhile, the present invention can also be applied in the various ways proposed by the foregoing patent application.

For example, when the fluid to be conveyed is other than those with which the squeezing and break of powder and granular material does matter, the dynamic groove seal does not need to be provided at the discharge-side end face of the rotary shaft. For example, for a reduction of the discharge rate, the fluid resistance may be increased by making the gap smaller, based on that the fluid resistance is inversely proportional to the triple of the gap between opposing faces.

(11th Embodiment)

Figure 24:
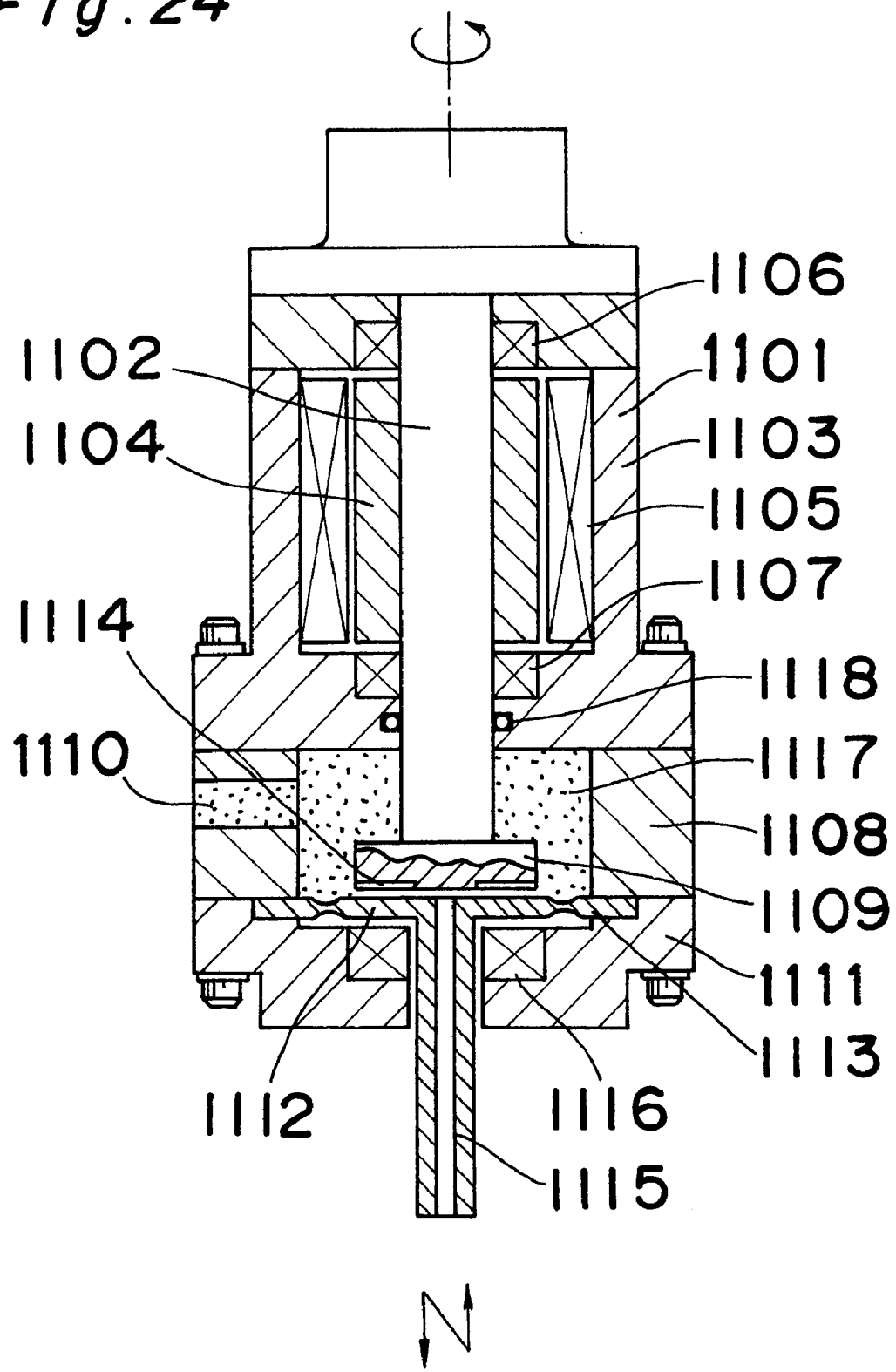
FIG. 24 is a front sectional view showing a dispenser according to an 11th embodiment of the present invention.

An 11th embodiment of the present invention is described below with reference to FIG. 24.

In the foregoing tenth embodiment, the thread groove pump has been used as the device for pressure-feeding the fluid within the pump chamber. However, in this embodiment shown below, the pressure-feeding device is provided outside the fluid discharge device, where the present invention is applied as a device for sealing the high-pressure fluid fed from outside in a non-contact manner.

Reference numeral 1101 denotes a motor, which gives relative rotation between a rotary shaft 1102 and an upper housing 1103 in which the motor 1101 is housed. A motor rotor 1104 is fixed to the rotary shaft 1102, and a motor stator 1105 is housed in the upper housing 1103. The rotary shaft 1102 is supported by a bearing A 1106 and a bearing B 1107.

Numeral 1108 denotes an intermediate housing, 1109 denotes a collar of a thrust dynamic seal fitted to a discharge-side end portion of the rotary shaft 1102, 1110 denotes an inlet port, 1111 denotes a lower housing, and 112 denotes a thrust plate (sleeve) 1112 fixed between the intermediate housing 1108 and the lower housing 1111. This thrust plate 1112 is provided with a hinge portion 1113 so that the thrust plate 1112 can be elastically deformed in the axial direction. In this embodiment, this thrust plate 1112 moves in the axial direction, thus corresponding to the movable sleeve of the tenth embodiment.

Numeral 1114 denotes a groove of a thrust dynamic seal formed at an end face of the collar 1109, 1115 denotes a discharge passage provided at a central portion of the thrust plate 1111, and 1116 denotes an electromagnetic solenoid for attracting up the thrust plate 1111. Such an electromagnetic system may be used in cases where the target object does not require so high a response characteristic of flow rate control.

Reference numeral 1117 denotes a pump chamber for communicating the inlet port 1110 and the discharge passage 1115 with each other, and 1118 denotes a fluid seal for preventing the penetration of the fluid into the motor 101 and the bearing 1107.

With no current applied to the electromagnetic solenoid 1116, the gap δ between the end face of the collar 1109 and its opposing face is narrow enough that the discharge is shut off by the effect of the dynamic seal. With a current applied to the electromagnetic solenoid 1116, the thrust plate 1112 is attracted by an electromagnet, thereby making the gap δ increased against the spring of the hinge portion 1113. When the generated pressure of the thrust dynamic seal decreases below the pressure of the supply fluid, the dynamic fluid seal loses its effect, causing the discharge passage to be opened.

In the case where a candle motor is used as the motor, where the flow passage for conveyed fluid is defined between a rotor and a stator of the motor, and where the rotary member is supported by a dynamic bearing that uses the conveyed fluid as a lubricating fluid, the mechanical seal portion can be eliminated (not shown).

(12th Embodiment)

Figure 25:
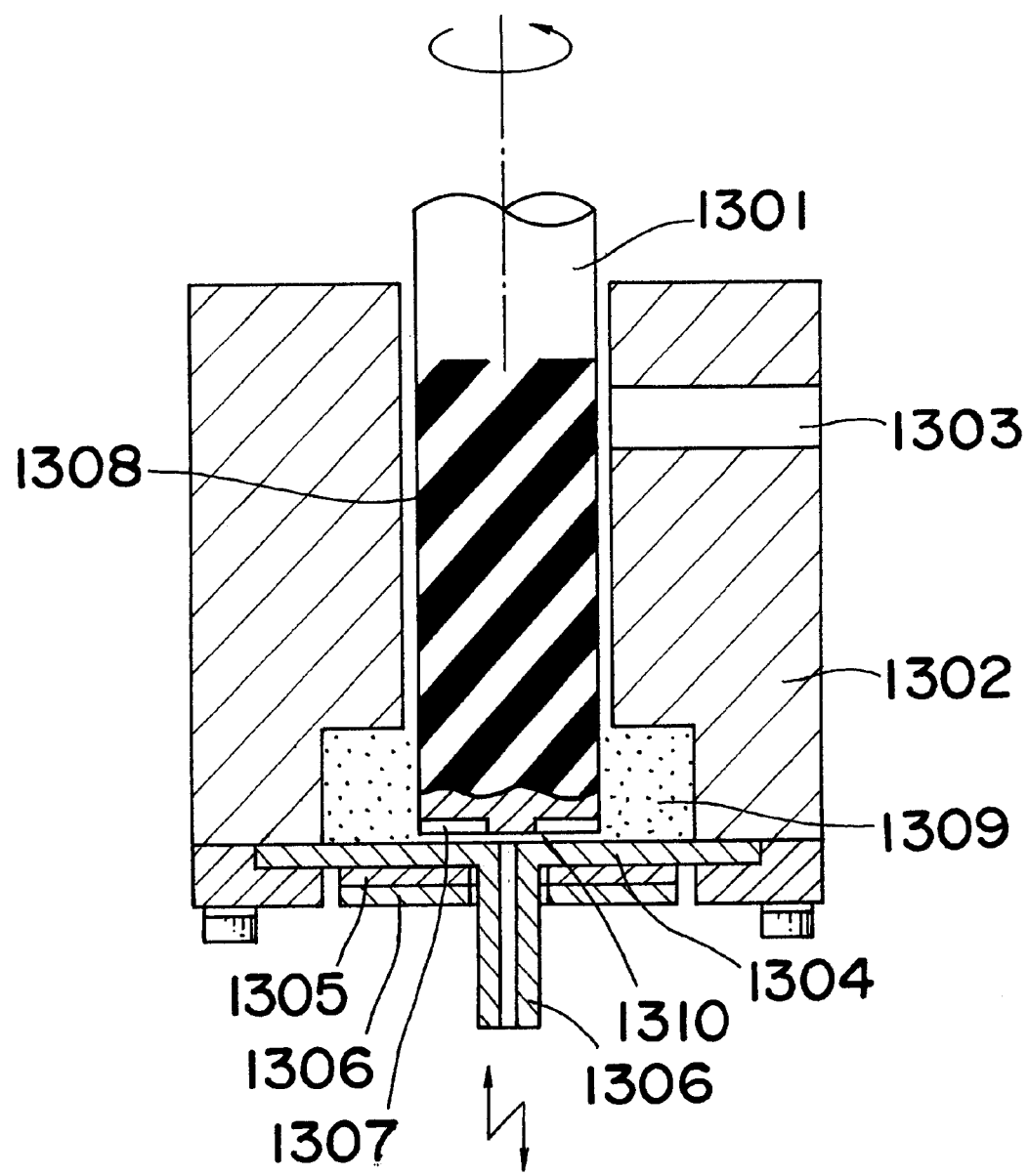
FIG. 25 is a front sectional view showing a dispenser according to a 12th embodiment of the present invention.

FIG. 25 shows an example in which a thin-plate piezoelectric element (e.g., bimorph type) is mounted on the thrust plate instead of giving an axial displacement to the thrust plate with an electromagnetic solenoid, so that the thrust plate is driven axially by the expansion and contraction effect of this piezoelectric element (motor, bearing, and the like being similar to those of the 11th embodiment and so omitted in the figure).

Reference numeral 1301 denotes a rotary shaft, 1302 denotes a housing, 1303 denotes an inlet port, 1304 denotes a thrust plate (sleeve) of a thin plate, 1305 and 1306 denote thin-film piezoelectric elements mounted on the thrust plate 1304, 1306 denotes a discharge nozzle integrated with the thrust plate 1304, 1307 denotes a groove of a thrust dynamic seal formed at an end face of the rotary shaft 1301, 1308 denotes thread grooves formed in the relative movement surfaces of the rotary shaft 1301 and the housing 1302 that houses this rotary shaft 1301 therein, and 1309 denotes a pump chamber (the thread groove part is blacked out in the figure).

With a voltage applied to the thin-film piezoelectric elements 1305, 1306, the piezoelectric elements are expanded and contracted radially, causing the thrust plate 1304 to be deformed axially. As a result, the gap size of the gap portion 1310 between the rotary shaft 1301 and its opposing face is changed.

In this case, the drive part is given by only the thrust plate, and a light load is imposed on the piezoelectric elements serving as actuators, thus allowing intermittent operation at high frequency to be implemented. By the drive with high frequency, there occurs a large squeeze pressure to the gap portion 1310, so that high-speed intermittent coating process by making use of this squeeze pressure can be implemented.

Since thin-plated piezoelectric elements are used, the dispenser body can be made very simple and small in size. Therefore, when a plurality of dispensers are accommodated close to one another in a common housing, there can be provided a multi-head type coating device capable of controlling the flow rate for each head independently (not shown).

Thus, with the present invention applied, it becomes possible to convey powder and granular material and arbitrarily control the flow rate of the powder and granular material while the overall flow passage ranging from the inlet side to the discharge passage is kept in a mechanical non-contact state. Therefore, the present invention is quite effective for flow rate control of powder and granular materials with which mechanical squeezing and breakage would cause not a few issues due to flow passage shutoff, for example, adhesive, electrically conductive paste, solder cream, fluorescent material, artificial blood, magnetic fluids, and the like.

The object as a concrete device to which the present invention is applied is not limited to the dispenser of the embodiment that covers minute flow rates, and the present invention may be applied also to various types of equipment and devices for the aforementioned powder and granular material manufacturing process.

(13th Embodiment)

An embodiment of II. "intermittent dispenser" with a positive displacement pump is described below with reference to FIGS. 26 to 29C.

The dispenser of this embodiment, by virtue of employing a positive displacement type pump, is enabled to execute quite-high-accuracy intermittent coating. That is, since fluid at a volume corresponding to a product of the piston area multiplied by the stroke is reliably discharged out as described later, a specified amount of fluid can be applied for coating without being affected by fluid viscosity, nozzle resistance, discharge time, or the like.

Figure 26:
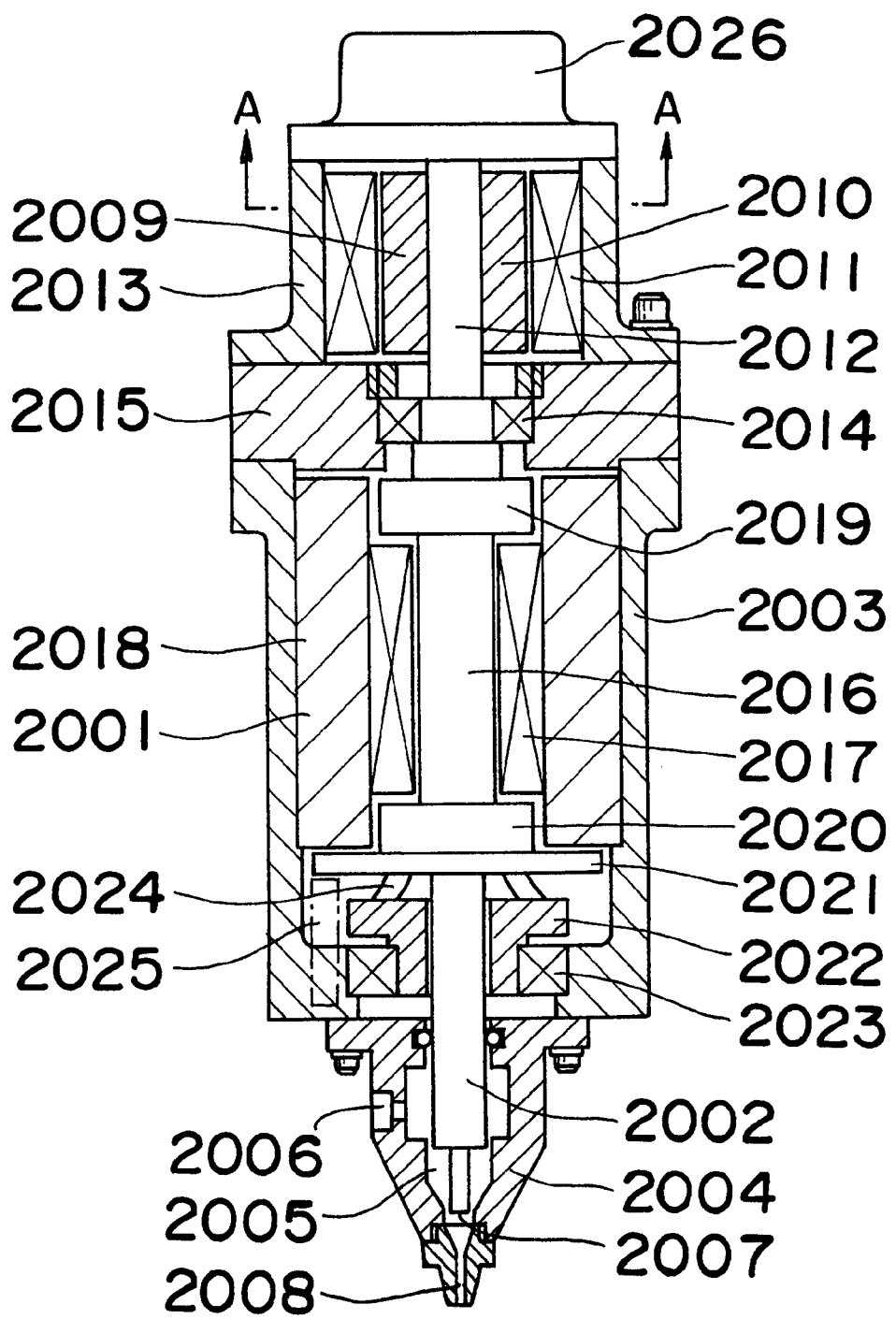
FIG. 26 is a front sectional view showing a dispenser according to a 13th embodiment of the present invention.

FIG. 26 shows a 13th embodiment of the present invention applied to a dispenser for the surface mounting of electronic components. In FIG. 26, reference numeral 2001 denotes a first actuator, which is given by an electromagnetostrictive actuator using a Giant-magnetostrictive element or the like, an electrostatic actuator, an electromagnetic solenoid or the like.

In the 13th embodiment, there is employed a Giant-magnetostrictive element capable of obtaining a high positioning accuracy, a high response characteristic and a large output load in order to intermittently discharge a very small quantity of a high-viscosity fluid at high speed with high accuracy.

Reference numeral 2002 denotes a piston, which is driven by the first actuator 2001 and corresponds to the direct-acting portion of a reciprocal (direct-acting) pump. The first actuator 2001 is housed in a housing 2003, and a cylinder 2004 for housing therein the piston 2002 is mounted on the lower end portion of this housing 2003. A pump chamber 2005 whose capacity is changed by axial movement of the piston 2002 is formed between this piston 2002 and the cylinder 2004. In the cylinder 2004 are formed an inlet hole 2006 and a discharge hole 2007, which communicate with the pump chamber 2005. Numeral 2008 denotes a discharge nozzle mounted on the lower end portion of the cylinder 2004.

Reference numeral 2009 denotes a second actuator, which gives a relative rotary motion between the piston 2002 and the cylinder 2004 and is constructed of a pulse motor, a DC servo motor, a resonant scanner, or the like.

Figure 27:
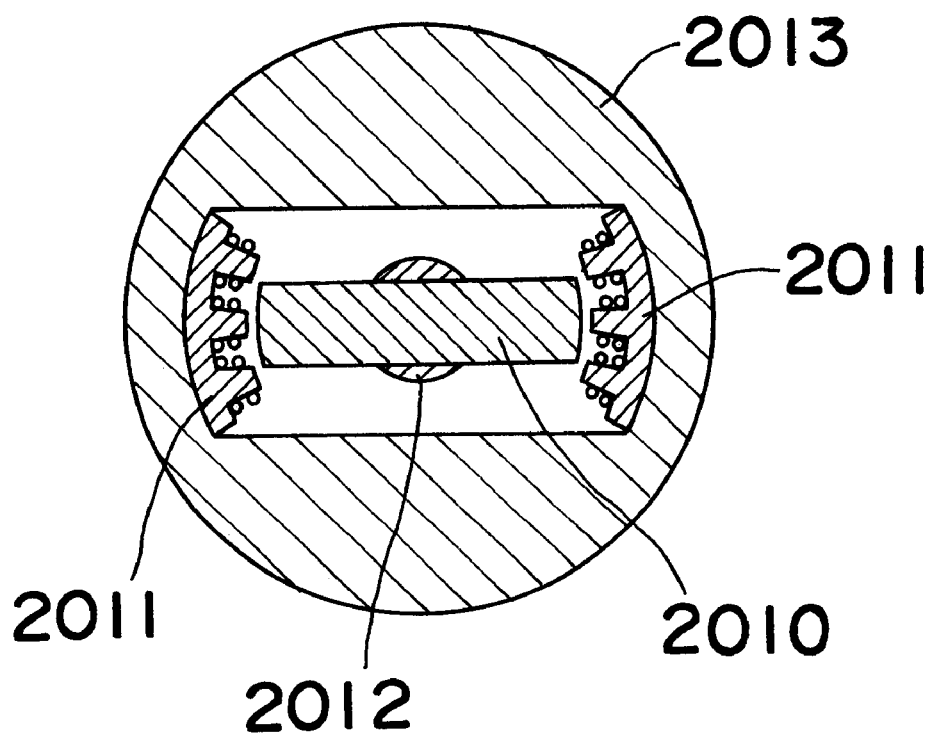
FIG. 27 is a sectional view taken along the line A—A of the motor section of the above 13th embodiment.

In the 13th embodiment, a swing type motor is employed as the second actuator 2009. In order to increase the response characteristic of this swing motion, there is employed a known scanning motor constructed of a rotor 2010 having a flat-shaped permanent magnet as shown in FIG. 27 (sectional view taken along the line A—A in FIG. 26) and producing a small moment of inertia, and a stationary side electromagnet 2011.

In the present specification, it is assumed that the rotary motion includes both a rotation in one direction and a swing motion of which the direction of rotation changes.

The rotor 2010 is fixed to a swing shaft 2012, while a stator 2011 is housed in a housing 2013. This swing shaft 2012 is supported by a ball bearing 2014, and the outer-ring side of this ball bearing 2014 is housed in a housing 2015.

Reference numeral 2016 denotes a Giant-magnetostrictive rod formed of a Giant-magnetostrictive element, and this Giant-magnetostrictive rod 2016 is tightened at its upper part to the swing shaft 2012 and tightened at its lower part to the piston 2002.

Reference numeral 2017 denotes a magnetic field coil for giving a magnetic field lengthwise of the Giant-magnetostrictive rod 2016. Numeral 2018 denotes a permanent magnet for giving a bias magnetic field, being housed in the housing 2003.

This permanent magnet 2018 preparatorily applies a magnetic field to the Giant-magnetostrictive rod 2016 to elevate the working point of a magnetic field. This magnetic bias allows the linearity of Giant-magnetostriction against magnetic field strength to be improved. Numeral 2019 denotes a cylindrical-shaped yoke member A, and 2020 denotes a yoke member B that has a thin thrust disc 2021 in its lower portion. A loop of the members 2016→2019→2017→2020→2016 forms a closed-loop magnetic circuit for controlling the expansion and contraction of the Giant-magnetostrictive rod 2016, while a loop of the members 2016→2019→2018→2020→2016 forms a closed-loop magnetic circuit for giving a bias magnetic field.

Consequently, the members 2016–2020 constitute a known Giant-magnetostrictive actuator 2001 that can control the axial expansion and contraction of the Giant-magnetostrictive rod with an electric current fed to the magnetic field coil.

The Giant-magnetostrictive material is an alloy of a rare earth element and iron, known examples thereof including $TbFe_2$, $DyFe_2$ $SmFe_2$, etc., which have been under rapid development into practical use in recent years.

Reference numeral 2022 denotes a sleeve press-fitted to the inner-ring side of the ball bearing 2023, and the outer-ring side of the ball bearing 2023 is housed in the housing 2003. Numeral 2024 denotes a bias spring fitted between the thrust disc 2021 and the sleeve 2022.

This bias spring 2024 normally applies a compressive stress to the Giant-magnetostrictive rod 2016 axially (upward in FIG. 26). This solves the drawback of the Giant-magnetostrictive element vulnerable to the tensile stress upon occurrence of repeated stress.

The bias spring 2024 also has radially rigidity with against the piston 2002. Therefore, although the piston 2002 and the Giant-magnetostrictive rod 2016 are freely rotatable under support by the two ball bearings 2014, 2023, yet the center position of the axis composed of the members 2002, 2016 and 2012 can be regulated with high rigidity. Thus, with the above construction, in the fluid rotation device of this embodiment, the piston 2002 of the pump is enabled to control both the rotary motion and the rectilinear motion of minute displacement concurrently and independently.

Further in the embodiment, in which the Giant-magnetostrictive element is employed for the first actuator, a driving force for making the rectilinear motion of the Giant-magnetostrictive rod 2016 (and the piston 2002) can be given from external in a non-contact manner.

Reference numeral 2025 denotes a displacement sensor mounted on the housing 2003, and the axial absolute position of the piston 2002 is detected by this displacement sensor 2025 and the thrust disc 2021.

When the Giant-magnetostrictive element is employed as the first actuator 2001, input voltage and displacement of the Giant-magnetostrictive element are proportional to each other, and therefore, the stroke control (flow rate control) of the piston 2002 can be fulfilled even by open loop control without any displacement sensor. However, if a position detecting device as in the present embodiment is provided for the execution of feedback control, higher-accuracy flow rate control can be executed.

Reference numeral 2026 denotes an encoder that is placed in the upper portion of the swing shaft 2012 and detects the angle of rotation of the shaft 2012.

In the pump that manages a minute flow rate, axial displacement of the piston needs only to be a minute displacement of the order of several micrometers to several tens of micrometers. By taking advantage of the fact that only a minute displacement is needed, the limit of the stroke of the Giant-magnetostrictive element does not matter.

When a high-viscosity fluid is discharged at high speed, the first actuator 2001 is required to produce a great thrust against a high fluid pressure. In this case, an electromagnetostrictive actuator capable of easily yielding a force of several hundred to several thousand newtons is preferable.

Instead of using the bias spring 2024 to regulate the radial position of the piston 2002, a slide bearing may be formed between the inner surface of the sleeve 2022 and the piston 2002 to radially support the piston 2002. Also, the inner surface of the sleeve 2022 and the piston 2002 may be so structured as to be relatively free in the axial direction but is regulated in the rotational direction.

In order to idealistically perform the pumping action of sucking a fluid and discharging the fluid in a specified quantity, it is preferable that the two operations of (1) shutting off the discharge passage in the intake stage and (2) shutting off the intake passage in the discharge stage can be performed.

FIGS. 28A–28C and FIGS. 29A–29C are detailed views of the pump section 2003 of FIG. 26 of the 13th embodiment of the present invention, showing an intake process (FIGS. 28A–28C) and a discharge process (FIGS. 29A–29C) of the dispenser. Reference numeral 2027 denotes a piston small-diameter portion, while 2028*a*, 2028*b* denote upper flow passage grooves formed on the piston 2002. Numerals 2029*a*, 2029*b* denote upper flow passage grooves formed on the cylinder 2004 side, while 2030*a*, 2030*b* denote lower flow passage grooves formed on the lower end face of the piston small-diameter portion 2027. Numerals 2031*a*, 2031*b* denote lower flow passage grooves formed on the cylinder 2004 side. There are further provided an upstream side gap portion 2032 of the pump through which the fluid flows, a midstream side gap portion 2033, a downstream side passage 2034 and a sealing member 2035.

Figure 28A:
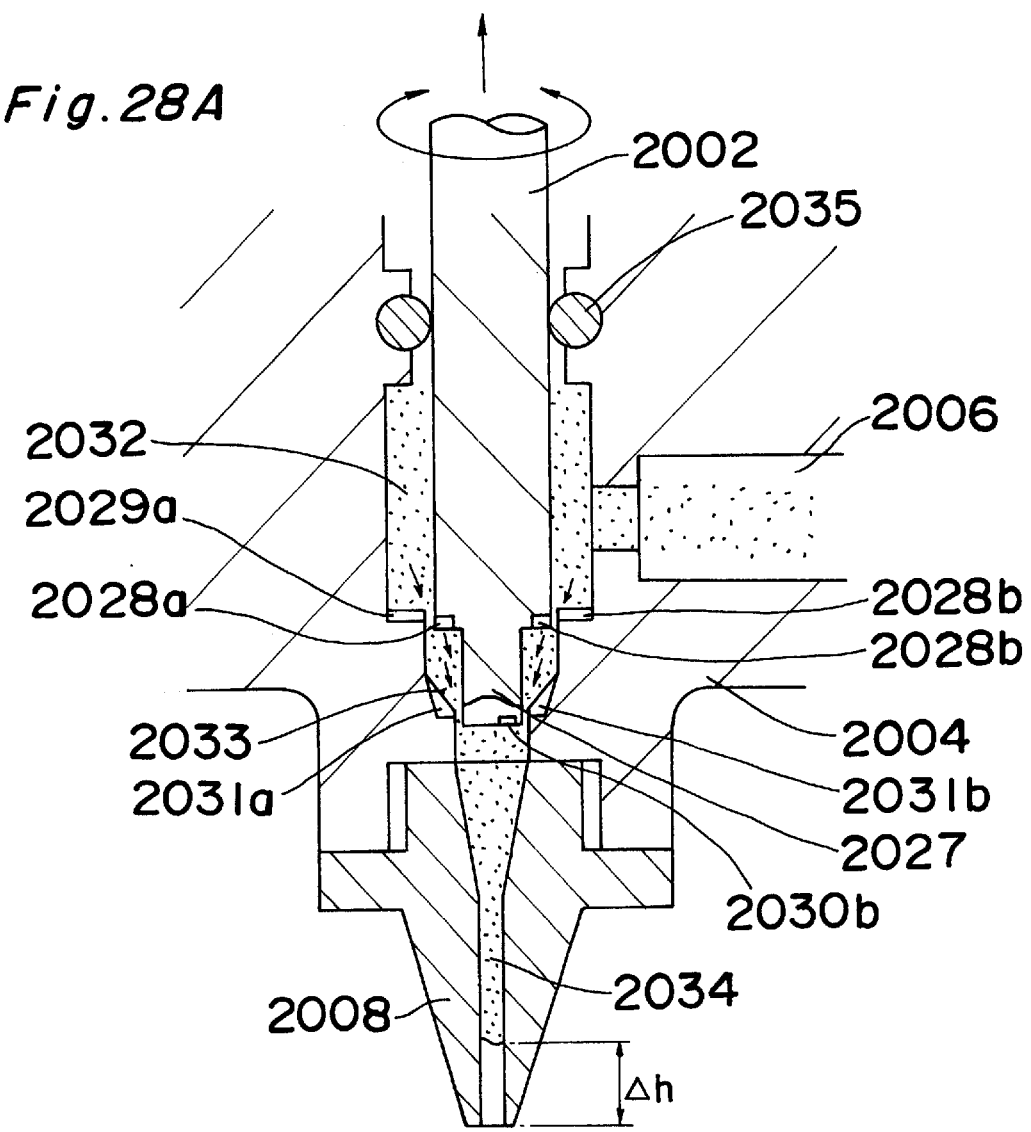
FIGS. 28A, 28B, and 28C are views showing an intake process of the pump section of the above 13th embodiment.
Figure 28B:
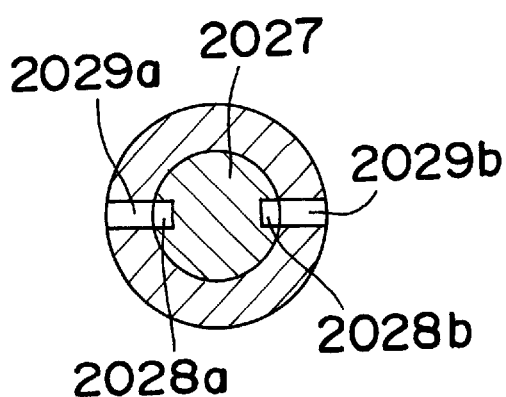
Figure 28C:
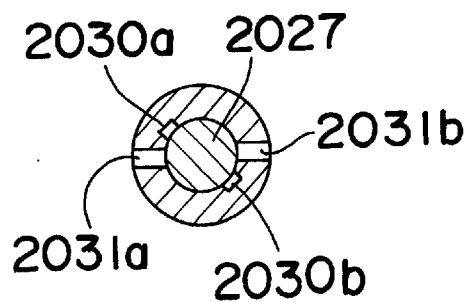

In the intake process of FIGS. 28A–28C, the piston 2002 is moved up in the direction of arrow (FIG. 28A) while keeping constant the relative angle between the piston 2002 and the cylinder 2004. Paying attention to the midstream side gap portion 2032, the outlet side becomes tightly closed as shown in FIG. 28C, while the inlet side becomes opened as shown in FIG. 28B. Therefore, the fluid flows into the midstream side gap portion 2033 as indicated by arrows in FIG. 28A. When the piston 2 is rotated in a state in which the intake process has been completed, there comes a state corresponding to that immediately after the start of the discharge process. In this stage, a gap portion is formed by the degree $\Delta h$ shown in FIG. 28A as a consequence of the elevation of the small-diameter piston 2027 at the tip portion of the discharge nozzle 2008 of the downstream side passage 2034.

The rotational position and the axial position of the piston 2002 and the timing of both positions are controlled by an external control unit (not shown) on the basis of outputs from the encoder 2026 and the displacement sensor 2025.

Figure 29A:
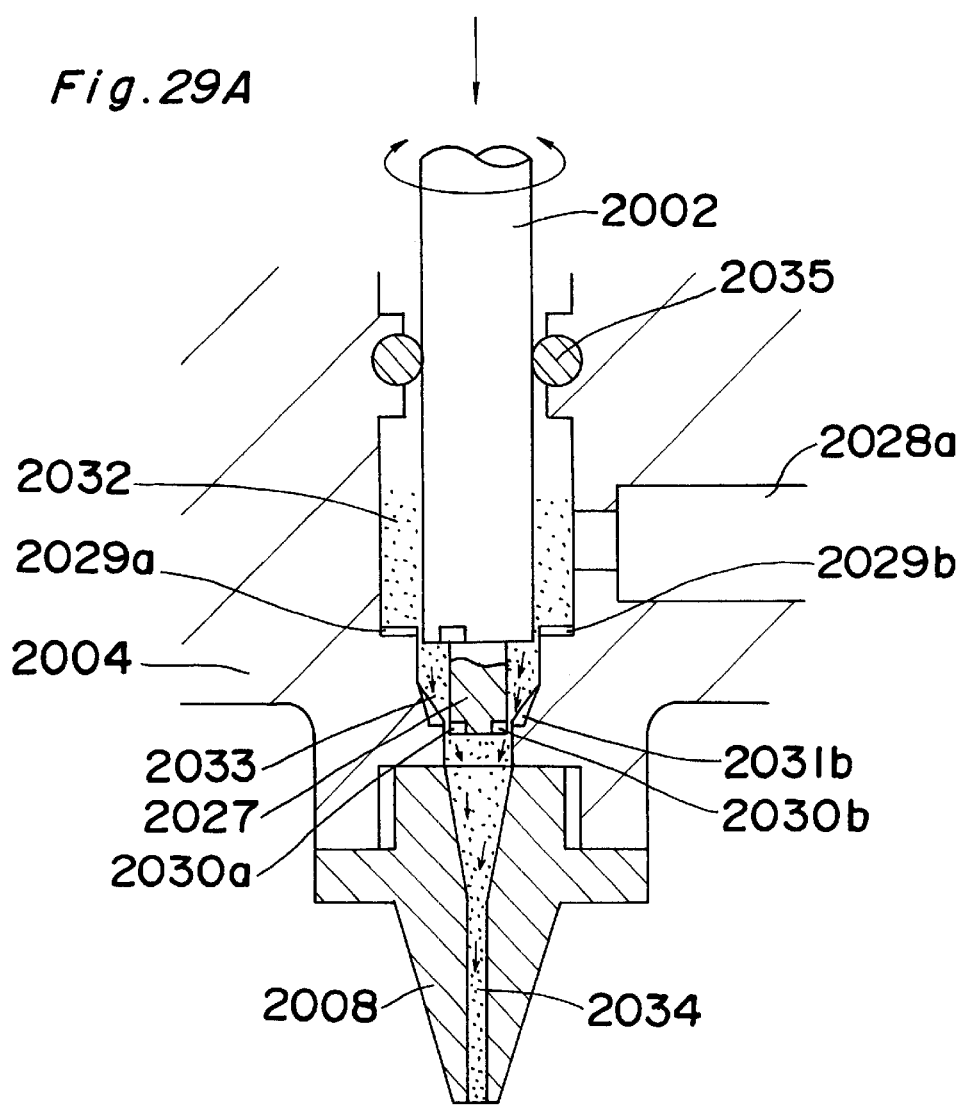
FIGS. 29A, 29B, and 29C are views showing a discharge process of the pump section of the above 13th embodiment.
Figure 29B:
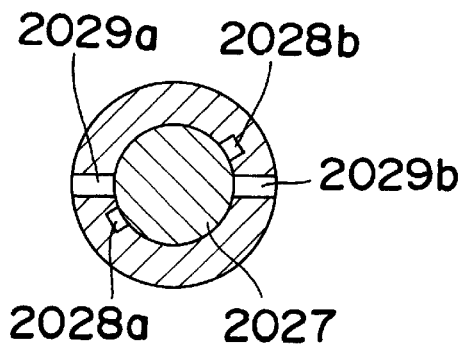
Figure 29C:
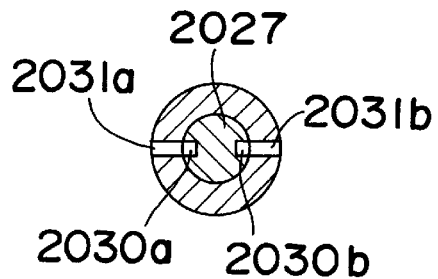

In the discharge process of FIGS. 29A–29C, the piston 2002 is moved down as shown in FIG. 29A.

The inlet side of the midstream side gap portion 2033 is shut off as shown in FIG. 29B, and conversely, the outlet side is opened (FIG. 29C). Therefore, the fluid that has been confined in the gap portion 2033 flows into the downstream side passage 2034 by a degree proportional to the amount of descent of the piston 2002. The small-diameter piston 2027 concurrently thrusts the fluid toward the discharge nozzle 2008 side, thereby discharging the fluid by the volume of a multiplication of a difference in area between the piston 2002 and the small-diameter piston 2027 by the stroke.

In the above-described embodiment, the first actuator (rectilinear motion) and the second actuator (rotary motion) have been operated not concurrently but sequentially by successively switching over between the actuators in operation in the order of the rectilinear motion→rotary motion→rectilinear motion. However, in order to increase the discharging speed, it is also possible to make the rectilinear motion of the first actuator while the second actuator (motor) is kept normally rotating.

In this case, the rotary motion may be either a swing motion as described in the embodiment or a one-direction rotation. The rotating speed of the motor is not always required to be constant, and the rotating speed may be arbitrarily variable in accordance with process conditions.

If a shallow thread groove is formed on the relative movement surfaces of the piston 2002 and the inner surface of the cylinder 2004, then the groove can concurrently produce the effect of conveying the fluid and the effect of preventing the fluid from leaking to the outside (not shown).

For example, if the piston is moved up a little in the state shown in FIG. 29B, then fluid dropping can also be prevented by the effect of the generation of a negative pressure (not shown).

The piston is moved down a little while the discharge flow passage is kept closed in the state immediately before the start of discharge, and subsequently the discharge passage is opened in the state in which the fluid has been compressed. Then, the discharged fluid can be made to fly greatly (not shown).

Although the second actuator (motor) is placed above the first actuator (Giant-magnetostrictive element) in the 13th embodiment, yet those actuators may be placed in the reverse arrangement. Otherwise, the first actuator may also be accommodated inside the second actuator.

Although the actions of the inlet valve and the discharge valve are obtained by taking advantage of the relative rotational displacement between the piston and the cylinder by means of the second actuator in the 13th embodiment, yet either one of the valves may be utilized. For example, it is possible to eliminate the discharge valve and continuously discharge the fluid by opening and closing only the inlet valve by the reciprocal motion of the piston while the piston is kept rotating (not shown).

The style of the pump is not limited to the positive displacement type, and it is acceptable to constitute a thread groove pump (viscosity pump) by taking advantage of, for example, the relative rotation between the piston and the cylinder and obtain the actions of the inlet valve and the discharge valve by the vertical motion of the piston. In this case, the roles of the first and second actuators are reversed with respect to those of the embodiment (not shown).

When the present invention is applied, the moment of inertia of the operating part can be made as small as possible in comparison with the prior art proposal (Japanese Patent Application No. 08-289543). When the present invention is applied to a minute flow rate pump, the piston is allowed to have a small diameter so that load resistances in the axial direction and the rotational direction received by the piston from the pump side can also be reduced. The conductive brush can also be eliminated, and this allows the load of the motor (second actuator) to be reduced and allows the response for rotation to be sufficiently improved. The electromagnetostrictive element, by virtue of having a sufficiently high response characteristic of not lower than several megahertz, exhibits high response characteristics for both rectilinear motion and rotary motion. As a result, a high-accuracy dispenser capable of intermittently discharging a high-viscosity fluid at high speed, which has not hitherto been able to be materialized by any means, can be provided.

Regarding the motor, if a scanning motor, which is used for a polygon mirror or the like, is used, then the moment of inertia of the motor rotor can further be reduced. If, for example, a moving coil type scanning motor is employed, then the moment of inertia can still further be reduced, allowing the rotational load of the motor to be reduced (not shown).

In the embodiment, in order to drive the Giant-magnetostrictive element (first actuator), the permanent magnet 2018 for giving a bias magnetic field is placed on the outer peripheral side of the magnetic field coil 2017. When this permanent magnet 2018 is omitted and a bias magnetic field is given with a bias current flowing through the magnetic field coil 2017, the body of the dispenser can be further reduced in its outer diameter (not shown).

As a result, it becomes possible to dispose a plurality of dispensers in parallel, where the present invention is applicable also to such processes as coating fluorescent material or the like onto a flat plate. In this case, whereas the intake-side discharge passage of coating material may be provided in common, the discharge flow rate (and its ON and OFF) can be controlled independently among those dispensers, so that a flat-plate surface coating at a high degree of freedom becomes implementable.

Otherwise, when the contents of a plurality of dispensers are accommodated in a common housing, there can be provided a multi-nozzle equipped coating device simpler in construction (not shown).

Furthermore, with the principle of the present invention applied, when an electrostatic actuator which produces a large output load to a specified capacity is employed for both or either one of the first and second actuators, the main body can be remarkably reduced in size. That is, a positive displacement type micro pump can be provided in the regions of micro machines or mini machines.

The fluid rotation device to which the present invention is applied can obtain the following effects:

1. A dispenser applicable to both intermittent coating and continuous coating can be realized;
2. High-speed intermittent coating of ultra-high speed response, which has been hard to implement by the conventional thread groove type, can be performed;
3. The device has high reliability without deterioration in performance due to sliding abrasion or the like; and
4. The pump of the present invention has further features as shown below.
    (1) High-speed coating of a high-viscosity fluid can be performed.
    (2) Discharge of a trace quantity can be performed with high accuracy. As one example, in coating an adhesive on an article such as a circuit board CB (for example, see FIG. 1), circle dots each having 0.5 mm-diameter and 0.2–0.25 mm-height can be intermittently formed and/or strips or lines each having 0.5 mm-width can be continuously formed. As one example, in coating a solder cream on an article such as a circuit board CB (for example, see FIG. 1), square dots each having 0.5 mm-length, 0.5 mm-width, and 100–150 $\mu$m-height can be intermittently formed and/or strips or lines each having 0.5 mm-width can be continuously formed. As one example, in coating a fluorescent material for CRT, strips or lines each having 100 μm-width and height on the order of A an be continuously formed.

(3) Thread-forming and dropping of fluid can easily be prevented.

(4) By virtue of a non-contact relation between the pump shaft and its opposing face, the pump can also cope with granules mixed with minute fine particles such as minute fine particles each having 5 μm-diameter or minute fine fluorescent materials each having 7–9 μm-diameter.

When the present invention is applied to, for example, surface mounting dispensers or the fluorescent coating of PDPs or CRT displays, advantages of the present invention can be fully exploited, producing tremendous effects.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A fluid discharge device comprising:
    a housing having an fluid inlet port and a fluid discharge port dedicated for discharging a fluid;
    a shaft disposed in the housing such that a pump chamber is defined by the shaft and the housing, wherein the fluid inlet port and the fluid discharge port are communicated with the pump chamber;
    a device for relatively rotating the shaft and the housing;
    an axial drive device for shifting the shaft with respect to the housing in an axial direction of the shaft to effect an axial displacement thereof; and
    a device for pressure-feeding the fluid that has flowed into the pump chamber toward a discharge port side of the housing.

2. A fluid discharge device as claimed in claim 1, wherein the device for pressure-feeding the fluid comprises a groove formed in an outer peripheral surface of the shaft so that, when the shaft is rotated relative to the housing, a volume of the fluid is pressure-fed from the pump chamber toward the fluid discharge port.

3. A fluid discharge device as claimed in claim 1, wherein the discharge fluid is conductive paste, adhesive, solder cream, or fluorescent material.

4. A fluid discharge device as claimed in claim 1, wherein a discharge flow passage is formed between the pump chamber and the discharge port by both a discharge-port side end face of the shaft and a relative movement surface, which is a surface that opposes the discharge-port side end face.

5. A fluid discharge device as claimed in claim 4, wherein a gap is formed between the discharge-port side end face of the shaft and the opposing relative movement surface, and the gap can be changed by operation of the axial drive device to increase or decrease fluid resistance between the pump chamber and the discharge port.

6. A fluid discharge device as claimed in claim 5, wherein the discharge-port side end face of the shaft includes a shallow groove for pressure-feeding the fluid radially.

7. A fluid discharge device as claimed in claim 1, wherein the device for pressure-feeding the fluid toward the discharge-port side of the housing comprises a spiral-shaped groove formed both in an outer peripheral portion of the shaft and in a relative movement surface of an inner surface of the housing, which is a surface that opposes the outer peripheral portion of the shaft.

8. A fluid discharge device as claimed in claim 1, further comprising a displacement sensor for detecting a relative axial displacement between the housing and the shaft, wherein the relative axial displacement can be adjusted by the axial drive device in response to a signal from the displacement sensor.

9. A fluid discharge device as claimed in claim 1, wherein the axial drive device is moved or expanded and contracted by an electromagnetic contactless electric-power supply device.

10. A fluid discharge device as claimed in claim 1, wherein the axial drive device comprises a Giant-magnetostrictive element.

11. A fluid discharge device comprising:
    a housing having a fluid inlet port;
    a shaft disposed in the housing such that a pump chamber is defined between an outer peripheral surface of the shaft and an inner peripheral surface of the housing, wherein the fluid inlet port opens into the pump chamber;
    a discharge nozzle connected to an end of the housing member, the discharge nozzle having a discharge hole that is in communication with the pump chamber;
    a device for rotating the shaft relative to the housing; and
    an axial drive device for shifting the shaft with respect to the housing in an axial direction of the shaft to effect an axial displacement thereof, wherein the shaft can be concurrently rotated and axially displaced, and
    wherein the shaft has a groove formed in an outer peripheral surface thereof so that, when the shaft is rotated relative to the housing, a volume of the fluid is pressure-fed from the pump chamber toward the discharge nozzle.

12. A fluid discharge device as claimed in claim 11, wherein a gap is formed between a discharge side end face of the shaft and an opposing inner surface of the discharge nozzle, and wherein the gap can be adjusted by operation of the axial drive device to increase or decrease fluid resistance between the pump chamber and the discharge port.

13. A fluid discharge device as claimed in claim 11, further comprising a displacement sensor for detecting an axial displacement of the shaft relative to the housing, wherein the axial relative displacement can be adjusted by the axial drive device in response to a signal from the displacement sensor.

14. A fluid discharge device as claimed in claim 11, wherein the axial drive device is moved or expanded and contracted by an electromagnetic contactless electric-power supply device.

15. A fluid discharge device as claimed in claim 11, wherein the axial drive device comprises a Giant-magnetostrictive element.

16. A fluid discharge device as claimed in claim 11, wherein the housing includes an upper housing member and a lower housing member,
    wherein the axial drive device and an upper portion of the shaft are housed in the upper housing member, and a lower portion of the shaft is housed in the lower housing member,
    wherein the fluid inlet port is formed in the lower housing member, and the pump chamber is formed between the lower portion of the shaft and an inner peripheral surface of the lower housing member.

* * * * *